US009602623B2

(12) United States Patent
Kuusilinna et al.

(10) Patent No.: US 9,602,623 B2
(45) Date of Patent: Mar. 21, 2017

(54) METHOD AND APPARATUS FOR CACHING LOCAL MASHUP SERVICE PARAMETERS

(75) Inventors: Kimmo Kalervo Kuusilinna, Tampere (FI); Arto Tapio Palin, Viiala (FI)

(73) Assignee: Nokia Corporation, Espoo (FI)

( * ) Notice: Subject to any disclaimer, the term of this patent is extended or adjusted under 35 U.S.C. 154(b) by 1166 days.

(21) Appl. No.: 13/609,473

(22) Filed: Sep. 11, 2012

(65) Prior Publication Data

US 2014/0073321 A1  Mar. 13, 2014

(51) Int. Cl.
  *H04W 48/18* (2009.01)
  *H04W 4/02* (2009.01)
  *H04L 29/08* (2006.01)
  *G06F 17/30* (2006.01)
  *H04M 1/725* (2006.01)

(52) U.S. Cl.
  CPC ............ *H04L 67/289* (2013.01); *G06F 17/30* (2013.01); *H04L 67/16* (2013.01); *H04L 67/2842* (2013.01); *H04M 1/7253* (2013.01)

(58) Field of Classification Search
  CPC ... H04L 67/16; H04L 67/289; H04L 67/2842; G06F 17/30; H04M 1/7253; H04Q 7/20; H04W 48/18
  USPC .............. 455/410–411, 414.1–414.4, 434, 455/456.1–456.6; 715/744, 753
  See application file for complete search history.

(56) References Cited

U.S. PATENT DOCUMENTS

| 8,930,440 B2* | 1/2015 | Agarwal | H04M 1/72561 709/203 |
|---|---|---|---|
| 2009/0312033 A1* | 12/2009 | Shen | H04W 4/02 455/456.1 |
| 2011/0113470 A1* | 5/2011 | Ma | G06F 17/30861 726/1 |
| 2011/0154373 A1* | 6/2011 | Kim | G06F 9/5011 719/320 |
| 2011/0161409 A1* | 6/2011 | Nair et al. | 709/203 |
| 2011/0209069 A1* | 8/2011 | Mohler | H04M 1/72569 715/744 |
| 2011/0219135 A1* | 9/2011 | Minamizawa | H04L 51/12 709/230 |
| 2012/0166732 A1* | 6/2012 | Wakayama | G06F 17/30902 711/133 |
| 2013/0036117 A1* | 2/2013 | Fisher | G06F 17/30041 707/736 |
| 2013/0346880 A1* | 12/2013 | Dheap | G08B 27/001 715/753 |
| 2014/0047351 A1* | 2/2014 | Cui | G06Q 10/06 715/744 |

(Continued)

*Primary Examiner* — Khawar Iqbal
(74) *Attorney, Agent, or Firm* — Ditthavong & Steiner, P.C.

(57) ABSTRACT

An approach is provided for caching parameters of local mashup services. One or more devices and/or service providers determine one or more mashup services, one or more trigger conditions associated with the one or more mashup services, and/or one or more actions associated with the one or more mashup services. Further, the one or more devices cache the one or more mashup services, the one or more trigger conditions, and/or the one or more actions at one or more local caches. Furthermore, the one or more devices and/or service providers determine one or more results of one or more queries for the one or more mashup services, the one or more trigger conditions, and/or the one or more actions from the one or more local caches.

18 Claims, 19 Drawing Sheets

(56) References Cited

U.S. PATENT DOCUMENTS

| | | | |
|---|---|---|---|
| 2014/0081962 A1* | 3/2014 | Lamba | G06F 17/30976 707/728 |
| 2015/0039668 A1* | 2/2015 | Moore | G06F 9/54 709/201 |
| 2015/0161201 A1* | 6/2015 | Sadikov | G06F 17/30463 707/722 |

* cited by examiner

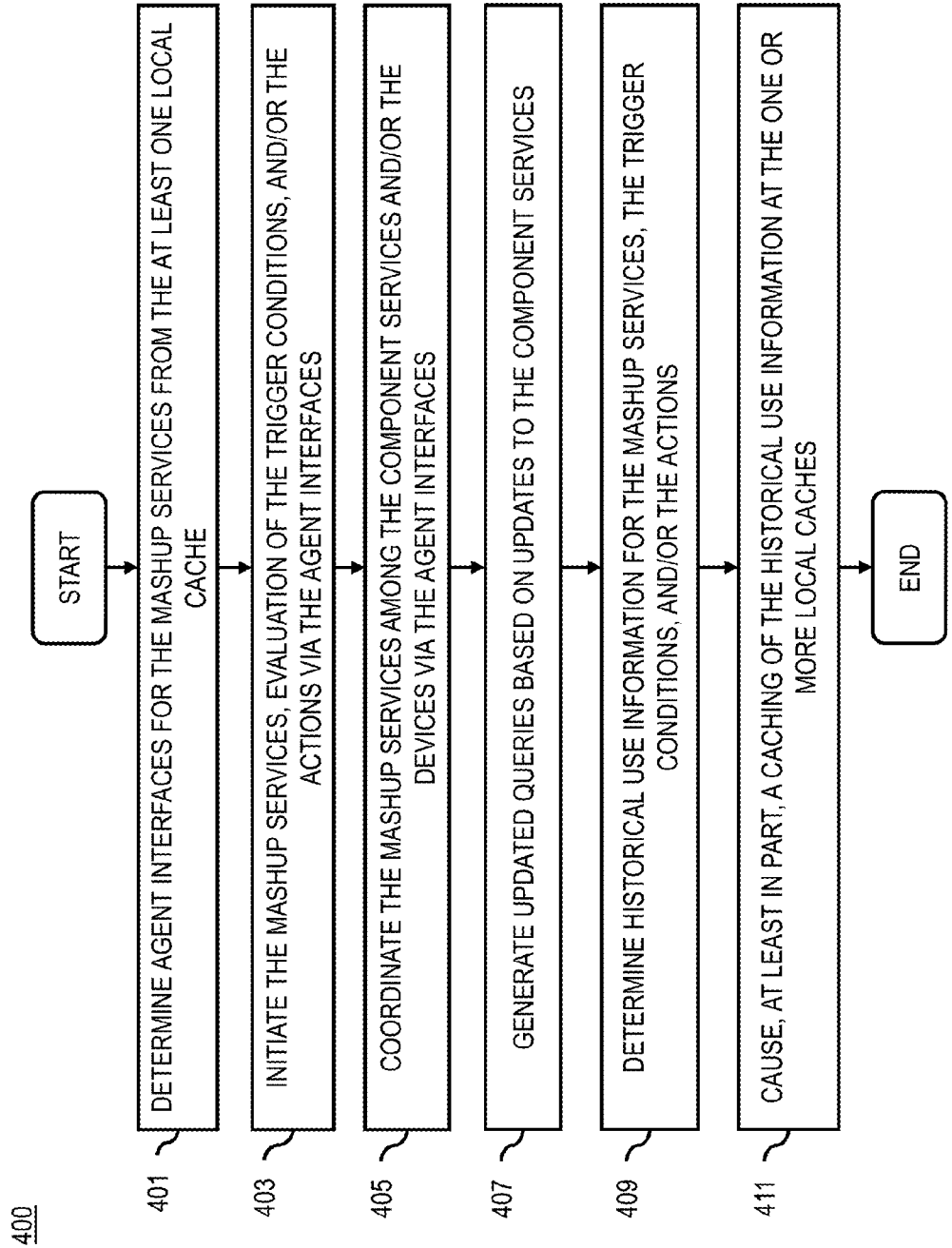

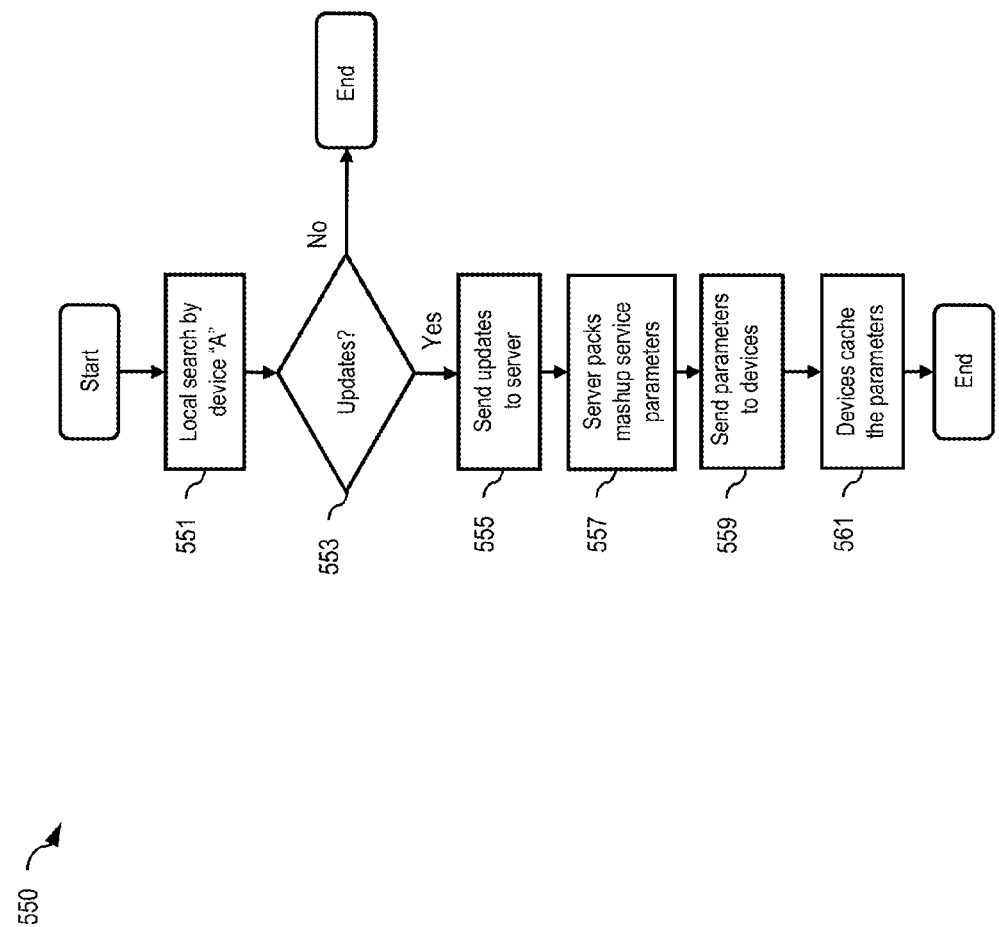

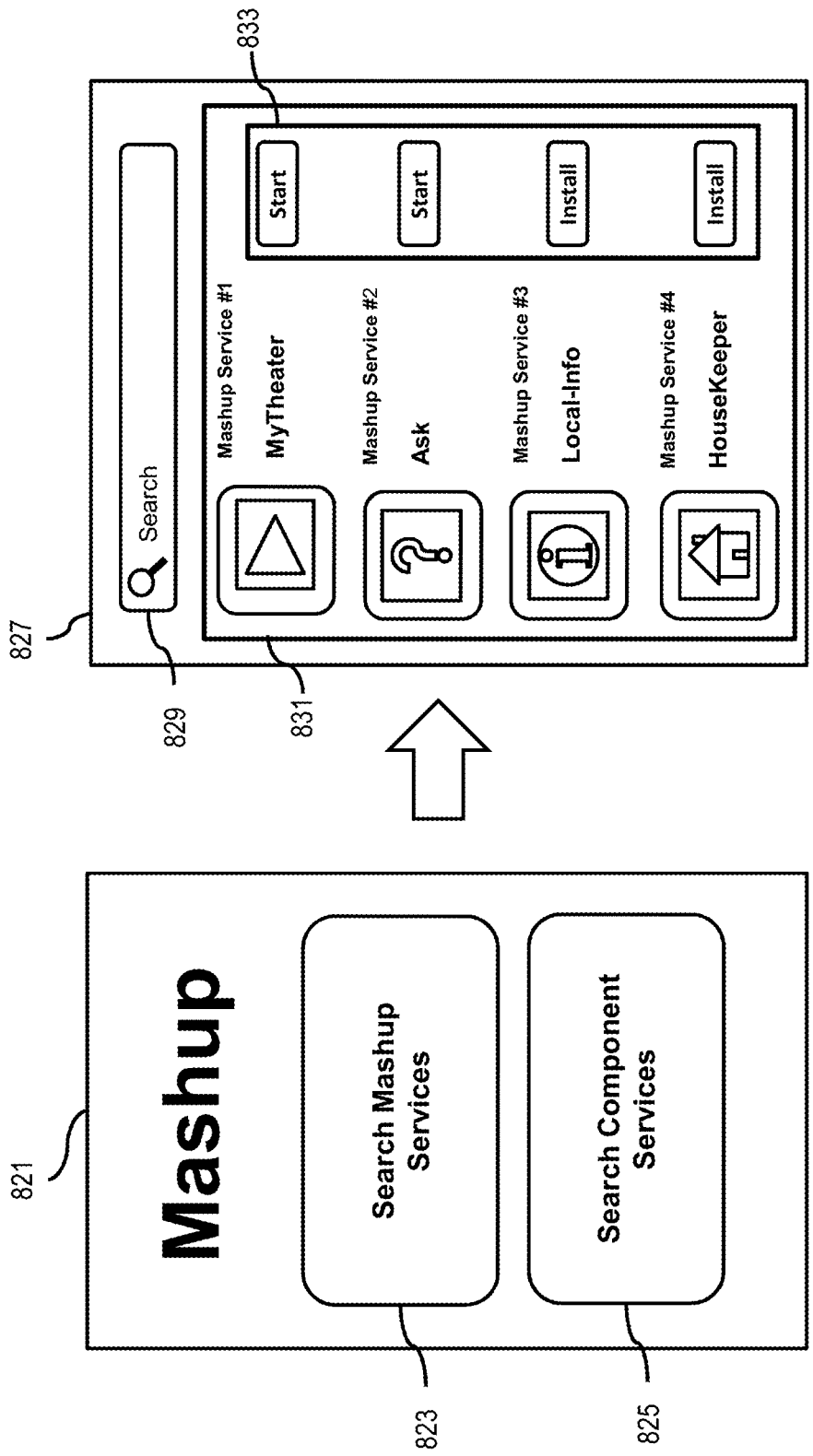

METHOD AND APPARATUS FOR CACHING LOCAL MASHUP SERVICE PARAMETERS

BACKGROUND

Service providers and device manufacturers (e.g., wireless, cellular, etc.) are continually challenged to deliver value and convenience to consumers by, for example, providing compelling network services. One area of interest has been development of services and applications whereby users and/or devices may utilize component devices via other devices in close proximity to coordinate and perform various tasks. In one instance, social devices may have "social" characteristics and when in close proximity, they may communicate with each other for coordinating joint tasks, for example, entertainment (e.g., talking phones, singing phones, etc.), sharing content, and the like. In another instance, local service mashups may take locally (potentially in multiple devices) available services, for example, component services (e.g., a monitors, speakers, microphones, etc.) available on other devices, and present them as an aggregate service called an "agent" to a potential user. Typically, formation of the "agent" is the responsibility of a server in cloud networking. However, in many instance and geographical areas, network services may not be readily available, may introduce long delays, and/or may include certain fees. Accordingly, service providers and device manufacturers face significant technical challenges for enabling users and devices to store (e.g., cache) trigger conditions and required data for interoperability and utilization of local mashup services.

SOME EXAMPLE EMBODIMENTS

Therefore, there is a need for an approach for caching parameters of local mashup services.

According to one embodiment, a method comprises determining one or more mashup services, one or more trigger conditions associated with the one or more mashup services, one or more actions associated with the one or more mashup services, or a combination thereof. The method also comprises causing, at least in part, a caching of the one or more mashup services, the one or more trigger conditions, the one or more actions, or a combination thereof at one or more local caches. Further, the method also comprises determining one or more results of one or more queries for the one or more mashup services, the one or more trigger conditions, the one or more actions, or a combination thereof from the one or more local caches.

According to another embodiment, an apparatus comprises at least one processor, and at least one memory including computer program code for one or more computer programs, the at least one memory and the computer program code configured to, with the at least one processor, cause, at least in part, the apparatus to determine one or more mashup services, one or more trigger conditions associated with the one or more mashup services, one or more actions associated with the one or more mashup services, or a combination thereof. The apparatus is further caused to cause, at least in part, a caching of the one or more mashup services, the one or more trigger conditions, the one or more actions, or a combination thereof at one or more local caches. Further, the apparatus is also caused to determine one or more results of one or more queries for the one or more mashup services, the one or more trigger conditions, the one or more actions, or a combination thereof from the one or more local caches.

According to another embodiment, a computer-readable storage medium carrying one or more sequences of one or more instructions which, when executed by one or more processors, cause, at least in part, an apparatus to determine one or more mashup services, one or more trigger conditions associated with the one or more mashup services, one or more actions associated with the one or more mashup services, or a combination thereof. The apparatus is further caused to cause, at least in part, a caching of the one or more mashup services, the one or more trigger conditions, the one or more actions, or a combination thereof at one or more local caches. Further, the apparatus is also caused to determine one or more results of one or more queries for the one or more mashup services, the one or more trigger conditions, the one or more actions, or a combination thereof from the one or more local caches.

According to another embodiment, an apparatus comprises means for determining one or more mashup services, one or more trigger conditions associated with the one or more mashup services, one or more actions associated with the one or more mashup services, or a combination thereof. The apparatus further comprises means for causing, at least in part, a caching of the one or more mashup services, the one or more trigger conditions, the one or more actions, or a combination thereof at one or more local caches. Further, the apparatus also comprises means for determining one or more results of one or more queries for the one or more mashup services, the one or more trigger conditions, the one or more actions, or a combination thereof from the one or more local caches.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for, at least, determining agent interfaces for mashup services and initiating the mashup services, according to various embodiments;

FIGS. 5A through 5D depict example flow charts illustrative of various processes for discovering and initiating mashup services, according to various embodiments;

FIGS. 8A through 8C diagrams of user interfaces utilized in the processes of FIGS. 3 and 4, according to various embodiments;

DESCRIPTION OF SOME EMBODIMENTS

Examples of a method, apparatus, and computer program for caching parameters of local mashup services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Mashup services may utilize a combination of applications, components, devices, and/or services that are available as individual elements for creating services and capabilities that were not necessarily available before the mashup service, wherein a device and/or a service provider may provide and orchestrate required actions for the mashup service.

Figure 1:
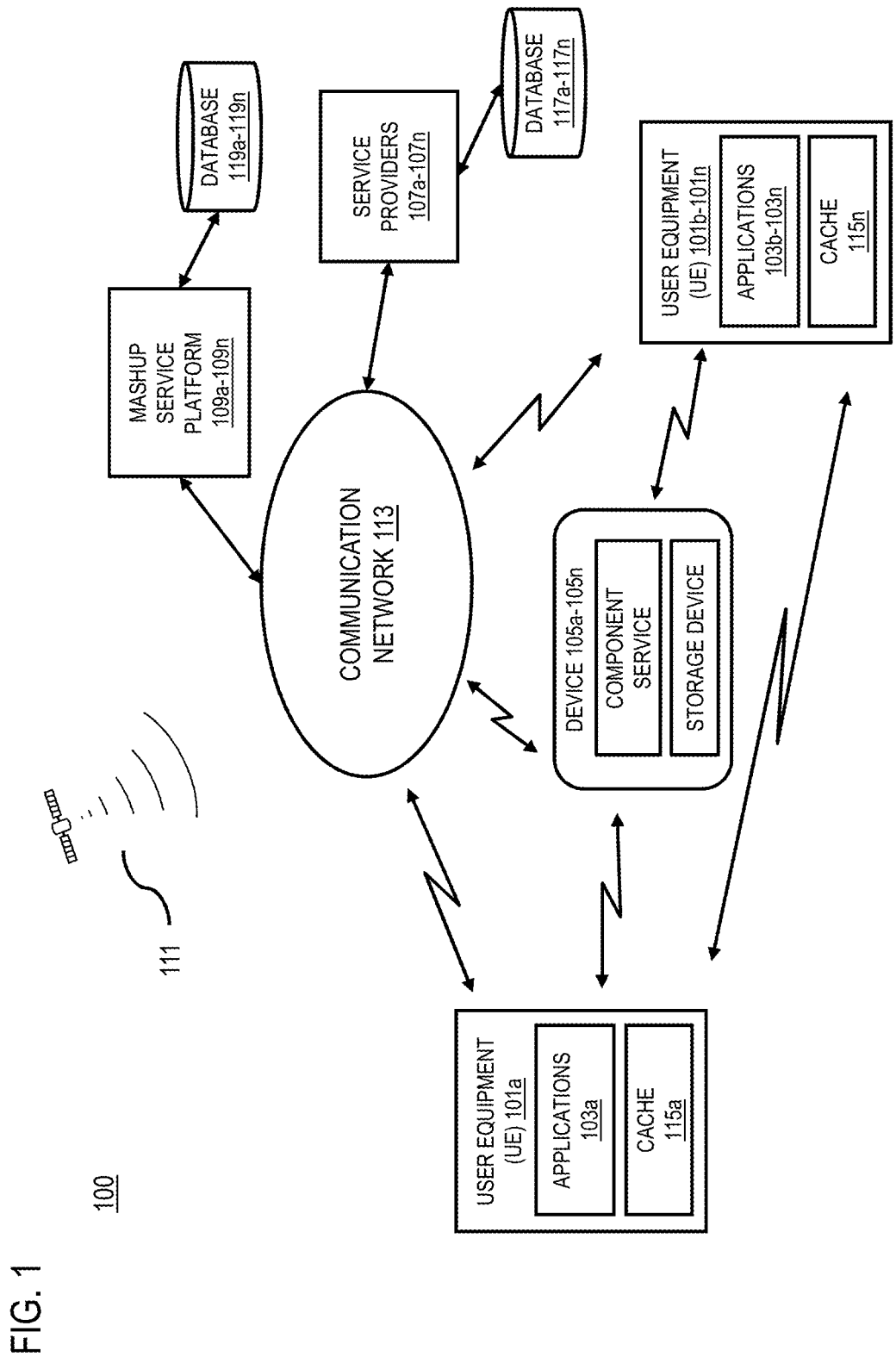
FIG. 1 is a diagram of a system capable of caching parameters of local mashup services, according to an embodiment.

FIG. 1 is a diagram of a system capable of caching parameters for local mashup services, according to an embodiment. Typically, users may utilize various devices for various tasks at various locations. For example, a user may utilize one or more personal computers, tablets, mobile phones, computer monitors, loud speakers, television sets, radio, etc., where the devices may communicatively connect to one another, to one or more other devices of other users, and/or to one or more service providers. Further, each device may have various capabilities/component services, for example, computing power, displaying video, reproducing audio, receiving broadcasts (e.g., video, audio, etc.) connect to a network (e.g., the Internet, a cellular network, wireless local area network (WLAN), etc.) Furthermore, users and/or the devices may arrange to utilize component services of the various devices to provide combined services (e.g., mashup, perform various tasks across multiple devices, etc.), for example, use a mobile phone to receive a media item (e.g., including audio and video) and then arrange for one or more other local devices (e.g., via a service provider, manually by a user, etc.) to consume the media item (e.g., a monitor for the video portion, speakers for the audio portion, a television set for the entire media item, etc.) However, in many instances the devices are utilized in isolation where the devices may not have connection to a service provider, may not be aware of other nearby local devices, and/or may not have capabilities/intelligence to setup a collaboration and/or a mashup service. For example, a first device may detect one or more other nearby devices, but may not have enough information available locally about the other devices, their available component services, and/or trigger points on how and when to use the component services, wherein the first device would have to inquire from at least one service provider on how to collaborate with other devices to establish and utilize a mashup service. However, in many regions and instances connectivity to a service provider may not always be available and/or a response time from a service provider may introduce delays in establishing a suitable mashup service. As a result, the service providers and device manufacturers face significant challenges to enable devices to facilitate discovering, initiating, and utilizing mashup services among available local devices.

To address this problem, a system 100 of FIG. 1 introduces the capability to cache parameters for local mashup services. Generally, a mashup service uses data or services from two or more sources (e.g., component services) to provide one or more new services. The component services may be web-based services (e.g., mapping services, video/audio streaming services, encyclopedia service, etc.) or local services (e.g., video screening on TV, audio playing on speakers, data storing on servers, etc.), where a combination of the component services can provide for more versatile services yielding a richer user experience.

In various embodiments, various devices (e.g., a mobile phone) may include one or more local caches (e.g., storage devices) containing one or more trigger conditions which can initiate one or more locally coordinated actions (e.g. availability of specific local services), one or more coordinated action scripts (e.g. local mashup agents, device dialogue coordination, etc.), and data related to the coordinated actions (e.g. communication exchanges between two devices). Further, the one or more devices and/or one or more service providers (e.g., cloud based) may run periodic local service discovery sessions. The trigger conditions may be one or more parameters associated with one or more devices, users, preferences, profile parameters, conditions, status, and the like, wherein a device, an application, a software, an algorithm and the like may utilize/process in order to initiate one or more actions. The service discovery results may be correlated with the one or more trigger conditions and as applicable, one or more appropriate locally coordinated actions may be executed substantially automatically by the one or more devices. In one embodiment, a user of a device may initiate a search for one or more services (e.g., component services) available at one or more other local devices, wherein the search and the component service coordination may be performed substantially locally via the one or more local caches of the one or more devices, where, at least, one advantage may be that the service discovery, trigger conditions, negotiations, and the coordination can be done with or without network (e.g., cloud) access.

In one embodiment, the system 100 may enable discovery of local component services in proximity to a device, where the local component services may be registered at a server which may maintain the proximity information. Thus, the proximity of the local components may be determined based on the proximity information. Otherwise, a device may discover available local devices and component services via one or more available wired and/or wireless connections—i.e., cellular, global positioning system (GPS), Bluetooth®, WiFi, short-range radio, radio frequency identification (RFID), near field communication (NFC), etc., wherein each local component service may utilize one or more connectivity techniques and options. In one embodiment, devices and component services without network connectivity (e.g., Internet) may utilize one or more network connections available via one or more other devices, for example, to access a mashup service available at a service provider (e.g., cloud service).

In one embodiment, the system 100 may enable determining mashup services based on one or more combinations of one or more available local component services. By way of an example, a mashup service may be selected from one or more available mashup services or it may be generated based on the available component services. The component services may be selected based on trigger conditions, specifications, proximity information, connectivity information, parameters, etc. associated with the one or more local devices. Compatibility between the component services and the mashup service may be determined to provide a reliable mashup service and interfaces and software of each component service may be shared to create one common interface and software.

In one embodiment, the system 100 may enable the devices to generate one or more mashup agents for the mashup services. By way of an example, the mashup agents can be generated to facilitate operation of the mashup service and control of the component services. Further, the mashup agents may contain the common interface and software, which may provide uniformity in operation of the mashup service and control of the component services. Furthermore, the mashup agent may be in form of an application downloadable or installable onto client devices.

In one embodiment, the system 100 determines one or more mashup services, one or more trigger conditions associated with the one or more mashup services, one or more actions associated with the one or more mashup services, or a combination thereof. In one embodiment, a device (e.g., a mobile phone, a tablet, etc.) may discover one or more other devices located in close proximity (e.g., all are within a nearby space) and examines local caches (e.g., memory devices) that may be available on the one or more devices for determining one or more trigger conditions, one or more actions, and/or data associated with a mashup service, which may be coordinated among the available devices. In one embodiment, the one or more actions may be based on one or more parameters associated with a device, a user, a location, a service provider, and the like wherein the actions and/or one or more triggers may be listed as one or more combinations of triggers. For example, a first device may discover a plurality of other devices in close proximity, which may be able to provide various component services (e.g., audio, video, network connectivity, etc.) to other devices. In various embodiments, the available devices may include various memory devices (e.g., RFID tag, cache, etc.) that may be accessible by other devices and/or by one or more service providers, wherein the memory devices may contain all or portions of information associated with a mashup service. In one embodiment, one or more of the available devices may determine the mashup services and required information from one or more service providers.

In one embodiment, the system 100 causes, at least in part, a caching of the one or more mashup services, the one or more trigger conditions, the one or more actions, or a combination thereof at one or more local caches. In various embodiments, the one or more available devices share and/or cache/store the information associated with the one or more mashup services, wherein a device may cache the information at its own cache device and/or cause storing at one or more memory devices of the one or more other devices. For example, a first device may determine all or portions of information for a mashup service, cache the information in its own memory device and communicate with one or more other devices and/or one or more cache devices on the one or more other devices for caching the information. In one embodiment, the information associated with the one or more mashup services may be due to information from one device or one service provider and/or may be aggregated from various devices and service providers.

In one embodiment, the system 100 determines one or more results of one or more queries for the one or more mashup services, the one or more trigger conditions, the one or more actions, or a combination thereof from the one or more local caches. In one embodiment, one or more devices may query for one or more mashup services from the discovered one or more other devices (e.g., in close proximity), wherein information associated with the mashup services may be stored at local caches of any of the devices in close proximity. For example, one or more devices may determine one or more trigger conditions for one or more actions for the one or more devices in close proximity, wherein one or more devices may or may not participate in the one or more mashup services and/or actions. In one instance, a first device may determine one or more trigger conditions for one or more other devices in close proximity, wherein the one or more other devices may perform one or more actions based on the one or more trigger conditions.

In one embodiment, the system 100 causes, at least in part, a discovery of one or more component services available to at least one device. In one embodiment, a device may utilize one or more applications and sensors for detecting one or more devices having one or more component services available. For example, a first device may utilize a close proximity scanning sensor (e.g., Bluetooth®, RFID, etc.) and/or a communication mechanism (e.g., WLAN) to detect presence of one or more other devices (e.g., a monitor, a TV, loud speakers, a tablet, etc.) that may be nearby. Further, the one or more other devices may indicate (e.g., via a communication link) various information associated with each device, for example, device identification (ID) number, device type, component services (e.g., audio, video, internet connection, etc.) available on each device, device settings, device resources, etc.

In one embodiment, the system 100 causes, at least in part, a generation of the one or more queries based, at least in part, on the one or more component services. In various embodiments, one or more devices may discover one or more component services available at one or more devices in close proximity and then inquire with the one or more devices and/or with one or more service providers for one or more mashup services based on the available component services. For example, a first device discovers several component services available at one or more nearby devices and inquires with the devices and/or one or more service providers whether any mashup services are available based on the discovered component services. In various embodiments, the one or more local caches are associated with the at least one device, one or more other devices associated with the one or more component services, or a combination thereof. For example, each device within a group devices in close proximity include one or more cache devices (e.g., storage devices), wherein one or more information items about the device, a component service, and/or information associated with one or more mashup services may be stored thereon.

In various embodiments, the discovery, the determining of the one or more results, or a combination thereof are performed using local connectivity among the at least one device, the one or more other devices, or a combination thereof. For example, one or more devices may utilize one or more wired and/or wireless connectivity/communication methods, i.e., Bluetooth®, RFID, NFC, etc. to connect with one or more other nearby devices to accomplish one or more tasks. In one embodiment, two or more devices may establish a common connection among the two or more devices and then one of the two or more devices establishes another connection with one or more other devices, whereby there the number of connections may be more than or less than the number of devices within a group/space.

In one embodiment, the system 100 causes, at least in part, a distribution of the one or more mashup services, the one or more trigger conditions, the one or more actions, or a combination thereof among the one or more local caches based, at least in part, on capability information, resource availability information, or a combination thereof associated with the at least one device, the one or more other devices, or a combination thereof. In various embodiments, the one or more nearby devices and/or one or more service providers may distribute the one or more mashup services, the one or more trigger conditions, the one or more actions, or a combination thereof among the one or more local caches based on capabilities of each device. For example, one device may be capable of receiving and storing the information at its own cache device. In another example, a device may receive and share the information with other devices. In one instance, a device may cause storing of the information at a storage device of another device; for example, a first device may cause storing of the information at an RFID tag on another device where the other device may or may not have the capability for receiving and/or storing the information.

In one embodiment, the system 100 determines one or more agent interfaces for the one or more mashup services from the at least one local cache. In one embodiment, one or more devices may generate one or more mashup agents for the mashup services. For example, the mashup agents may be generated to facilitate operation of the mashup service and control of the component services at the one or more devices. Further, the mashup agents may contain a common interface and software, which may provide uniformity in operation of the mashup service and control of the component services. Furthermore, the mashup agent may be in form of an application downloadable or installable onto client devices.

In one embodiment, the system 100 causes, at least in part, an initiation of (a) the one or more mashup services, (b) an evaluation of the one or more trigger conditions, (c) the one or more actions, or (d) a combination thereof via the one or more agent interfaces. In various embodiments, one or more devices and/or one or more service providers may initiate one or more mashup services via the one or more agent interfaces. For example, a first device may receive and utilize a mashup agent to initiate one or more mashup services available via one or more devices. In one embodiment, the one or more devices may utilize a mashup agent to evaluate one or more trigger conditions available at the one or more devices (e.g., in cache) and/or from one or more service providers. For example, a trigger condition may depend on various parameters of a device, available component services, user preferences, location information, and the like. In one embodiment, one or more devices may initiate one or more actions associated with available mashup services via the one or more agents. For example, a device and/or a user may select from one or more mashup services available via the mashup agent and initiate one or more actions for utilization of the one or more mashup services.

In one embodiment, the system 100 causes, at least in part, a coordination of the one or more mashup services among the one or more component services, the at least one device, the one or more other devices, or a combination thereof via the one or more agent interfaces. In various embodiments, one or more devices, one or more service providers, and/or one or more user may utilize the one or more agent interfaces to initiate and coordinate the one or more mashup services. For example, a first device may utilize an agent interface to substantially automatically coordinate one or more mashup services available via one or more devices. In one embodiment, a user may utilize an agent interface to initiate and coordinate one or more mashup services available at one or more devices.

In one embodiment, the system 100 causes, at least in part, a generation of one or more updated queries based, at least in part, on one or more updates to the one or more component services. In various embodiments, a device, a user, and/or a service provider may monitor and/or determine any updates to the available component services and/or devices, wherein one or more updated queries may be generated if there are any updates to the availability of the component services and/or devices. For example, one or more new devices and/or component services may become available (e.g., come within close proximity) in addition to the available current component services and/or devices. In one example, one or more current devices and/or component services may become unavailable (e.g., move away, drop out, disconnect, etc.) from a current list of available component services and/or devices. In various embodiments, discovery of the one or more component services and/or the devices is performed periodically, according to a schedule (e.g., on a device, per a service provider), on demand (e.g., by a user, by a service provider, by an application, etc.), or a combination thereof to determine the one or more updates.

In one embodiment, the system 100 determines historical use information for the one or more mashup services, the one or more trigger conditions, the one or more actions, or a combination thereof. In various embodiments, one or more devices and/or one or more service providers may determine historical use information of one or more devices and/or one or more users associated with one or more mashup services, one or more trigger conditions, and/or one or more actions. For example, historical use information may include information on various mashup services utilized by a device and/or by a user—i.e., utilizing audio and video component services whenever possible. Further, the historical information may indicate various trigger conditions that may be associated with a device, with a user, with a location, with various available component services, with device resource status (e.g., battery power, network connectivity, etc.), and the like.

In one embodiment, the system 100 causes, at least in part, a caching of the historical use information at the one or more local caches, wherein the caching of the one or more mashup services, the one or more trigger conditions, the one or more actions, or a combination thereof is based, at least in part, on the historical use information. In various embodiments, one or more applications, one or more users, and/or one or more service providers may cause caching (e.g., storing) of the historical information at a cache device (e.g., storage device) associated with a device. For example, the historical information may include information on a mashup service last used, trigger conditions that cause the mashup service, types of component services utilized and/or available for the mashup service, location information, time, date, and the like.

As discussed above, the system 100 may provide various benefits and advantages to the users utilizing the methods of the system 100. For example, the system 100, at least, provides an efficient mechanism for caching/storing information locally at a device, which may be utilized to coordinate and initiate one or more mashup services by a device, a user, and/or a service provider, wherein the mashup services may include various component services on various nearby devices. Further, the system 100 provides easy but yet efficient methods for the devices to access information from local cache devices associated with one or more devices, for coordinating one or more mashup services with or without access to a service provider (e.g., cloud service).

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, media application, user interface (UI), map application, web client, etc. to communicate with other UEs 101, one or more devices 105a-105n (also collectively referred to as devices 105) including one or more component services and storage devices, one or more service providers 107a-107n (also collectively referred to as service providers 107), one or more mashup service platforms 109a-109n, one or more GPS satellites 111, and/or with other components of the system 100 directly and/or via communication network 113. In one embodiment, the UEs 101 may include cache (memory) devices 115a-115n (also collectively referred to as cache 115) for storing information associated with the UEs 101, mashup services, service providers, component services, and the like. In addition, the UEs 101 can execute one or more applications 103, which may be a software client for storing, processing, and/or forwarding one or more information items to other components of the system 100.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the service providers 107 may include and/or have access to one or more database 117a-117n (also collectively referred to as database 117), which may include various user information, user profiles, user preferences, one or more profiles of one or more user devices (e.g., device configuration, sensors information, etc.), service provider 107 information, other service providers' information, and the like. In one embodiment, the service providers 107 may include one or more service providers offering one or more services, for example, online shopping, social networking services (e.g., blogging), media upload, media download, media streaming, account management services, or a combination thereof.

In one embodiment, the mashup service platform 109 may include and/or have access to one or more database 119a-119n (also collectively referred to as database 119), which may include various user information, user profiles, user preferences, one or more profiles of one or more user devices (e.g., device configuration, sensors information, etc.), mashup service platform 109 information, other service providers' information, and the like. The mashup service platform 109 may include one or more servers which process data and communicate with other components of the system 100 to provide mashup services. In one embodiment, the mashup service platform 109 may include a proximity server which can determine proximity information between the UEs 101, the devices 105, and/or other devices capable of providing one or more component services. The proximity information may be registered with the proximity server or discovered through local wireless connections (e.g., WiFi, Bluetooth®, short-range radio, etc.) The registration may include storing, at a server, registration and/or proximity information, connectivity information, specifications, parameters, etc. for utilizing the component services in one or more mashup services. Further, the registration information may be used for searching the mashup services.

In one embodiment, the mashup service platform 109 may also include a mashup service server which may determine one or more mashup services and/or generate one or more mashup agents for the mashup services. For example, when a UE 101 requests a search for a mashup service, the mashup service server may reply with a mashup agent if one or more mashup services are available to the UE 101. In one embodiment, a mashup agent may include software logic for combining one or more available component services into a mashup service, a common user interface for the mashup service, and information on how to use the one or more available component services. A mashup agent may be a web application installed in various servers in the system 100 or a mobile application in the UEs 101.

In certain embodiments, the mashup service platform 109 may be implemented as a collection of one or more hardware, software, algorithms, firmware, or combinations thereof, wherein all or portions of it may be integrated for use with the service providers 107 and/or at with the UEs 101. In various embodiments, the mashup service platform 109 can be maintained on a network server, while operating in connection with the service providers 107 and/or the UEs 101 as an extensible feature, a web-service, an applet, a script, an object-oriented application, or the like for providing mashup services to one or more components of the system 100. to enable searching for and/or processing of the social networking information. Further, the mashup service platform 109 and/or the service providers 107 may utilize one or more service application programming interfaces (APIs)/integrated interface, through which communication, media, content, and information (e.g., associated with users, UEs 101, and devices 105) may be shared, accessed and/or processed.

By way of example, the UEs 101, the devices 105, the service providers 107, and the mashup service platform 109 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the devices 105, and the mashup service platform 109 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
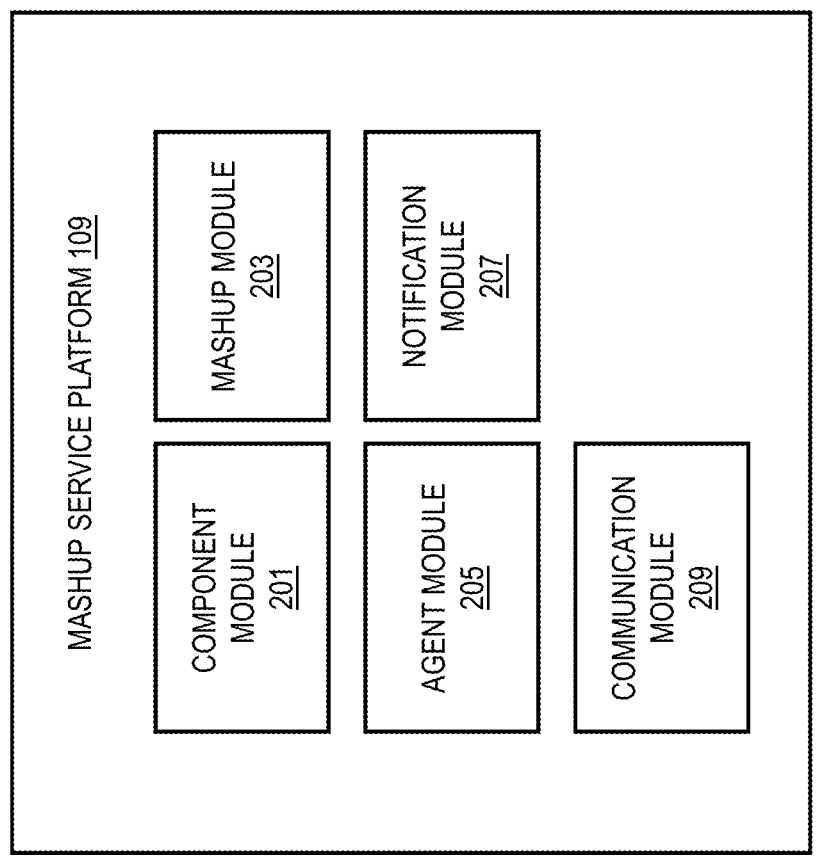
FIG. 2 is a diagram of the components of mashup service platform, according to an embodiment.

FIG. 2 is a diagram of the components of mashup service platform, according to an embodiment. By way of example, the mashup service platform 109 includes one or more components for providing mashup service of component services. It is contemplated that the functions of these components may be combined in one or more components or performed by other components of equivalent functionality. In this embodiment, the mashup service platform includes a component module 201, a mashup module 203, an agent module 205, a notification module 207, and a communication module 209.

In one embodiment, the component module 201 may enable registration of component services available at the UEs 101 and/or at devices 105. The registration may involve storing, in a server, registration information including proximity information, connectivity information, specifications, parameters, etc. for using the component services. The component module 201 may also determine the one or more available component services in the proximity based on the proximity information.

In one embodiment, the mashup module 203 may determine the mashup services based on a combination of available component services. In determining the mashup services, the mashup module 203 may determine the specifications for the mashup service and whether the component services satisfy the specifications. The mashup module 203 may also generate one or more mashup agents for interfacing with the mashup service and the component services. In generating a mashup agent, the mashup module 203 may also determine software (e.g., logics, interfaces, layers, programs, etc.) to be included in the mashup agent.

In one embodiment, the mashup module 203 may send a mashup agent to the UE 101 and/or to a device 105 upon a request to download or install the mashup agent. The agent module 205 may maintain the mashup agents in various servers as well as allowing access to them. The mashup agents may be updated or modified upon any changes to the component services.

In one embodiment, the notification module 207 may present notifications that the mashup service is available based on availability of the component services to the UEs 101 and/or the devices 105. The notifications may include push or pop-up notifications, sound or vibration notification, etc.

In one embodiment, the communication module 209 may enable connections and data transmissions between the mashup service platform 109, the UEs 101, the devices 105, and/or the service providers 107 via the communication network 113.

Figure 3:
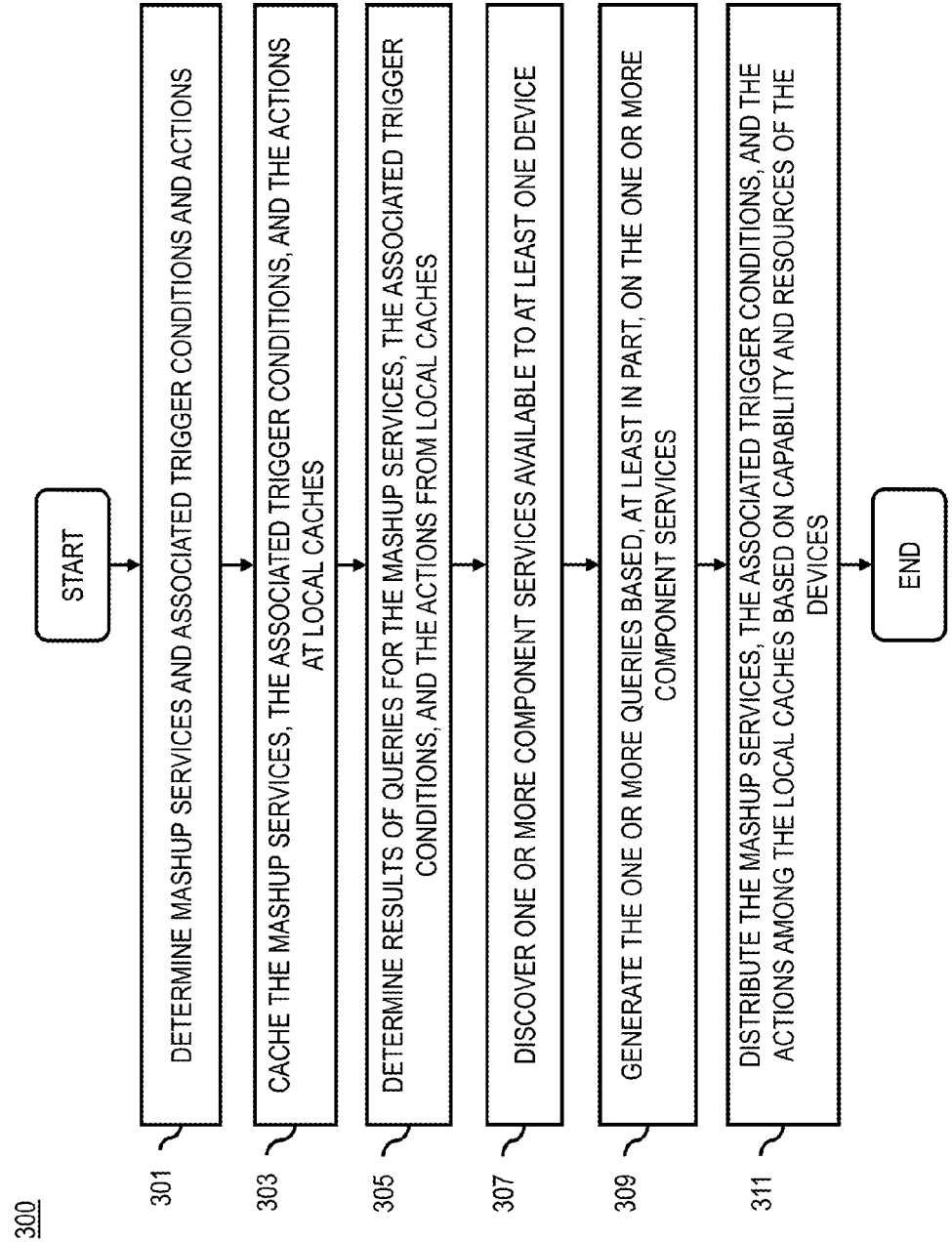
FIG. 3 is a flowchart of a process for, at least, determining and caching mashup services and associated information, according to various embodiments.
Figure 10:
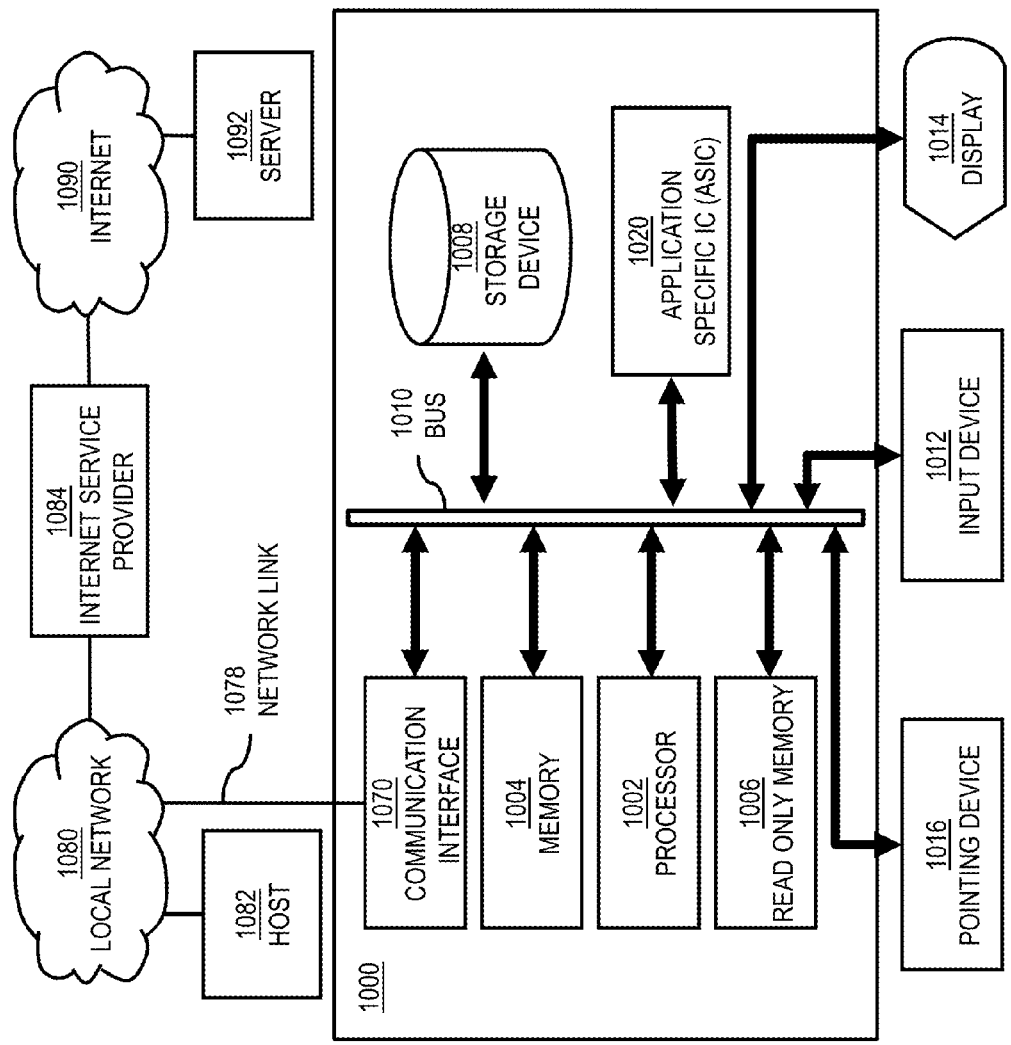
FIG. 10 is a diagram of hardware that can be used to implement an embodiment of the invention.

FIG. 3 is a flowchart of a process for, at least, determining and caching mashup services and associated information, according to various embodiments. In various embodiments, the mashup service platform 109, the service providers 107, the devices 105, and/or the UEs 101 perform the process 300 and are implemented in, for instance, a chip set including a processor and a memory as shown in FIG. 10. As such, the mashup service platform 109, the service providers 107, the devices 105, and/or the UEs 101 can provide means for accomplishing various parts of the process 300 as well as means for accomplishing other processes in conjunction with other components of the system 100. Throughout this process, the mashup service platform 109 is referred to as completing various portions of the process 300, however, it is understood that other components of the system 100 can perform some of and/or all of the process steps. Further, in various embodiments, the mashup service platform 109 may be implemented in one or more entities of the system 100.

In step 301, the UE 101 and/or the mashup service platform 109 determines one or more mashup services, one or more trigger conditions associated with the one or more mashup services, one or more actions associated with the one or more mashup services, or a combination thereof. In one embodiment, a device (e.g., a mobile phone, a tablet, etc.) may discover one or more other devices located in close proximity (e.g., all are within a nearby space) and examines local caches (e.g., memory devices) that may be available on the one or more devices for determining one or more trigger conditions, one or more actions, and/or data associated with a mashup service, which may be coordinated among the available devices. In one embodiment, the one or more actions may be based on one or more parameters associated with a device, a user, a location, a service provider, and the like wherein the actions and/or one or more triggers may be listed as one or more combinations of triggers. For example, a first device may discover a plurality of other devices in close proximity, which may be able to provide various component services (e.g., audio, video, network connectivity, etc.) to other devices. In various embodiments, the available devices may include various memory devices (e.g., RFID tag, cache, etc.) that may be accessible by other devices and/or by one or more service providers, wherein the memory devices may contain all or portions of information associated with a mashup service. In one embodiment, one or more of the available devices may determine the mashup services and required information from one or more service providers.

In step 303, the UE 101 and/or the mashup service platform 109 causes, at least in part, a caching of the one or more mashup services, the one or more trigger conditions, the one or more actions, or a combination thereof at one or more local caches. In various embodiments, the one or more available devices share and/or cache/store the information associated with the one or more mashup services, wherein a device may cache the information at its own cache device and/or cause storing at one or more memory devices of the one or more other devices. For example, a first device may determine all or portions of information for a mashup service, cache the information in its own memory device and communicate with one or more other devices and/or one or more cache devices on the one or more other devices for caching the information. In one embodiment, the information associated with the one or more mashup services may be due to information from one device or one service provider and/or may be aggregated from various devices and service providers.

In step 305, the UE 101 and/or the mashup service platform 109 determines one or more results of one or more queries for the one or more mashup services, the one or more trigger conditions, the one or more actions, or a combination thereof from the one or more local caches. In one embodiment, one or more devices may query for one or more mashup services from the discovered one or more other devices (e.g., in close proximity), wherein information associated with the mashup services may be stored at local caches of any of the devices in close proximity. For example, one or more devices may determine one or more trigger conditions for one or more actions for the one or more devices in close proximity, wherein one or more devices may or may not participate in the one or more mashup services and/or actions. In one instance, a first device may determine one or more trigger conditions for one or more other devices in close proximity, wherein the one or more other devices may perform one or more actions based on the one or more trigger conditions.

In step 307, the UE 101 and/or the mashup service platform 109 causes, at least in part, a discovery of one or more component services available to at least one device. In one embodiment, a device may utilize one or more applications and sensors for detecting one or more devices having one or more component services available. For example, a first device may utilize a close proximity scanning sensor (e.g., Bluetooth®, RFID, etc.) and/or a communication mechanism (e.g., WLAN) to detect presence of one or more other devices (e.g., a monitor, a TV, loud speakers, a tablet, etc.) that may be nearby. Further, the one or more other devices may indicate (e.g., via a communication link) various information associated with each device, for example, device identification (ID) number, device type, component services (e.g., audio, video, internet connection, etc.) available on each device, device settings, device resources, etc.

In step 309, the UE 101 and/or the mashup service platform 109 causes, at least in part, a generation of the one or more queries based, at least in part, on the one or more component services. In various embodiments, one or more devices may discover one or more component services available at one or more devices in close proximity and then inquire with the one or more devices and/or with one or more service providers for one or more mashup services based on the available component services. For example, a first device discovers several component services available at one or more nearby devices and inquires with the devices and/or one or more service providers whether any mashup services are available based on the discovered component services. In various embodiments, the one or more local caches are associated with the at least one device, one or more other devices associated with the one or more component services, or a combination thereof. For example, each device within a group devices in close proximity include one or more cache devices (e.g., storage devices), wherein one or more information items about the device, a component service, and/or information associated with one or more mashup services may be stored thereon. In various embodiments, the discovery, the determining of the one or more results, or a combination thereof are performed using local connectivity among the at least one device, the one or more other devices, or a combination thereof. For example, one or more devices may utilize one or more wired and/or wireless connectivity/communication methods, i.e., Bluetooth®, RFID, NFC, etc. to connect with one or more other nearby devices to accomplish one or more tasks. In one embodiment, two or more devices may establish a common connection among the two or more devices and then one of the two or more devices establishes another connection with one or more other devices, whereby there the number of connections may be more than or less than the number of devices within a group/space.

In step 311, the UE 101 and/or the mashup service platform 109 causes, at least in part, a distribution of the one or more mashup services, the one or more trigger conditions, the one or more actions, or a combination thereof among the one or more local caches based, at least in part, on capability information, resource availability information, or a combination thereof associated with the at least one device, the one or more other devices, or a combination thereof. In various embodiments, the one or more nearby devices and/or one or more service providers may distribute the one or more mashup services, the one or more trigger conditions, the one or more actions, or a combination thereof among the one or more local caches based on capabilities of each device. For example, one device may be capable of receiving and storing the information at its own cache device. In another example, a device may receive and share the information with other devices. In one instance, a device may cause storing of the information at a storage device of another device; for example, a first device may cause storing of the information at an RFID tag on another device where the other device may or may not have the capability for receiving and/or storing the information.

FIG. 4 is a flowchart of a process for, at least, determining agent interfaces for and initiating the mashup services, according to various embodiments. In various embodiments, the mashup service platform 109, the service providers 107, the devices 105, and/or the UEs 101 perform the process 400 and are implemented in, for instance, a chip set including a processor and a memory as shown in FIG. 10. As such, the mashup service platform 109, the service providers 107, the devices 105, and/or the UEs 101 can provide means for accomplishing various parts of the process 400 as well as means for accomplishing other processes in conjunction with other components of the system 100. Throughout this process, the mashup service platform 109 is referred to as completing various portions of the process 300, however, it is understood that other components of the system 100 can perform some of and/or all of the process steps. Further, in various embodiments, the mashup service platform 109 may be implemented in one or more entities of the system 100.

In step 401, the UE 101 and/or the mashup service platform 109 determines one or more agent interfaces for the one or more mashup services from the at least one local cache. In one embodiment, one or more devices may generate one or more mashup agents for the mashup services. For example, the mashup agents may be generated to facilitate operation of the mashup service and control of the component services at the one or more devices. Further, the mashup agents may contain a common interface and software, which may provide uniformity in operation of the mashup service and control of the component services. Furthermore, the mashup agent may be in form of an application downloadable or installable onto client devices.

In step 403, the UE 101 and/or the mashup service platform 109 causes, at least in part, an initiation of (a) the one or more mashup services, (b) an evaluation of the one or more trigger conditions, (c) the one or more actions, or (d) a combination thereof via the one or more agent interfaces. In various embodiments, one or more devices and/or one or more service providers may initiate one or more mashup services via the one or more agent interfaces. For example, a first device may receive and utilize a mashup agent to initiate one or more mashup services available via one or more devices. In one embodiment, the one or more devices may utilize a mashup agent to evaluate one or more trigger conditions available at the one or more devices (e.g., in cache) and/or from one or more service providers. For example, a trigger condition may depend on various parameters of a device, available component services, user preferences, location information, and the like. In one embodiment, one or more devices may initiate one or more actions associated with available mashup services via the one or more agents. For example, a device and/or a user may select from one or more mashup services available via the mashup agent and initiate one or more actions for utilization of the one or more mashup services.

In step 405, the UE 101 and/or the mashup service platform 109 causes, at least in part, a coordination of the one or more mashup services among the one or more component services, the at least one device, the one or more other devices, or a combination thereof via the one or more agent interfaces. In various embodiments, one or more devices, one or more service providers, and/or one or more user may utilize the one or more agent interfaces to initiate and coordinate the one or more mashup services. For example, a first device may utilize an agent interface to substantially automatically coordinate one or more mashup services available via one or more devices. In one embodiment, a user may utilize an agent interface to initiate and coordinate one or more mashup services available at one or more devices.

In step 407, the UE 101 and/or the mashup service platform 109 causes, at least in part, a generation of one or more updated queries based, at least in part, on one or more updates to the one or more component services. In various embodiments, a device, a user, and/or a service provider may monitor and/or determine any updates to the available component services and/or devices, wherein one or more updated queries may be generated if there are any updates to the availability of the component services and/or devices. For example, one or more new devices and/or component services may become available (e.g., come within close proximity) in addition to the available current component services and/or devices. In one example, one or more current devices and/or component services may become unavailable (e.g., move away, drop out, disconnect, etc.) from a current list of available component services and/or devices. In various embodiments, discovery of the one or more component services and/or the devices is performed periodically, according to a schedule (e.g., on a device, per a service provider), on demand (e.g., by a user, by a service provider, by an application, etc.), or a combination thereof to determine the one or more updates.

In step 409, the UE 101 and/or the mashup service platform 109 determines historical use information for the one or more mashup services, the one or more trigger conditions, the one or more actions, or a combination thereof. In various embodiments, one or more devices and/or one or more service providers may determine historical use information of one or more devices and/or one or more users associated with one or more mashup services, one or more trigger conditions, and/or one or more actions. For example, historical use information may include information on various mashup services utilized by a device and/or by a user—i.e., utilizing audio and video component services whenever possible. Further, the historical information may indicate various trigger conditions that may be associated with a device, with a user, with a location, with various available component services, with device resource status (e.g., battery power, network connectivity, etc.), and the like.

In step 411, the UE 101 and/or the mashup service platform 109 causes, at least in part, a caching of the historical use information at the one or more local caches, wherein the caching of the one or more mashup services, the one or more trigger conditions, the one or more actions, or a combination thereof is based, at least in part, on the historical use information. In various embodiments, one or more applications, one or more users, and/or one or more service providers may cause caching (e.g., storing) of the historical information at a cache device (e.g., storage device) associated with a device. For example, the historical information may include information on a mashup service last used, trigger conditions that cause the mashup service, types of component services utilized and/or available for the mashup service, location information, time, date, and the like.

FIGS. 5A through 5D depict example flow charts illustrative of various processes for discovering and initiating mashup services, according to various embodiments.

Figure 5A:
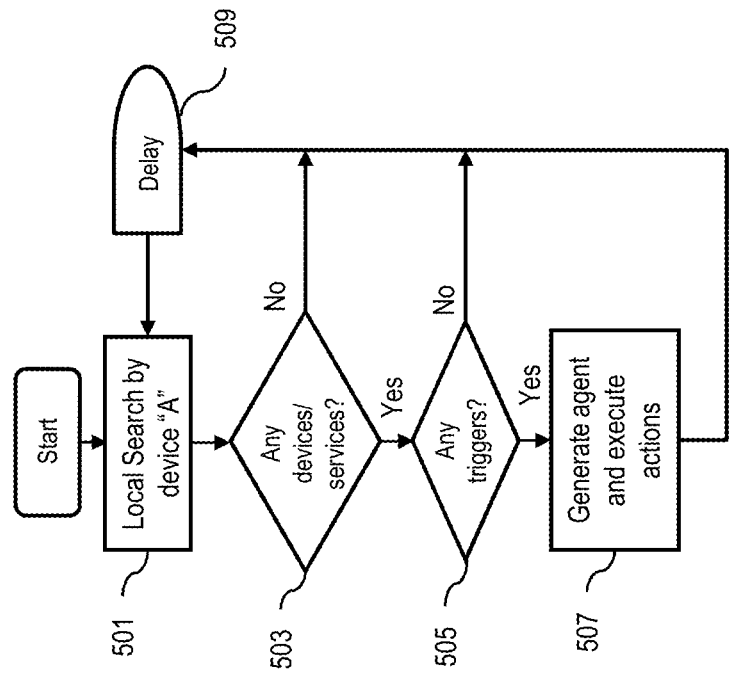

FIG. 5A depicts process 500 where at step 501, a user and/or the applications 103 initiate a search, via a device "A" (e.g., a UE 101), for one or more component services and/or other devices available nearby. At step 503, if one or more other devices and/or component services are discovered, then at step 505, device "A" checks its local cache for one or more trigger conditions, at least, associated with device "A," user preferences, device "A" resources (e.g., battery levels, operating modes, etc.), current location, available component services, other device types, current tasks/processes at device "A," network connectivity, and the like. At step 507, in one embodiment, if any trigger conditions are met, then the device "A" cache returns one or more actions, data, and mashup agents to be executed and/or utilized by device "A" and/or the other devices. In one embodiment, if the data can be accessed over a network connection, then one or more links to the data may be provided. In various embodiments, if at 507 there are several actions to choose from, then one or more actions may be selected at random, or by default all or some may be executed, or a user may select one or more actions, or may be based on an algorithm and selection criteria—for example, if a device is in a silent mode, then only visual/display interface and/or actions may be selected and executed. After completing step 507 and/or having negative conditions at step 503 and/or at step 505, the process may return to step 509 where the process 500 may wait (e.g., defined by a user, an application, a service provider, etc.) before executing the process again at step 501. In one embodiment, if a network connection to a mashup service platform 109 is and/or becomes available, then it may coordinate all or portions of the process 500 with or without the device "A" assistance.

Figure 5B:
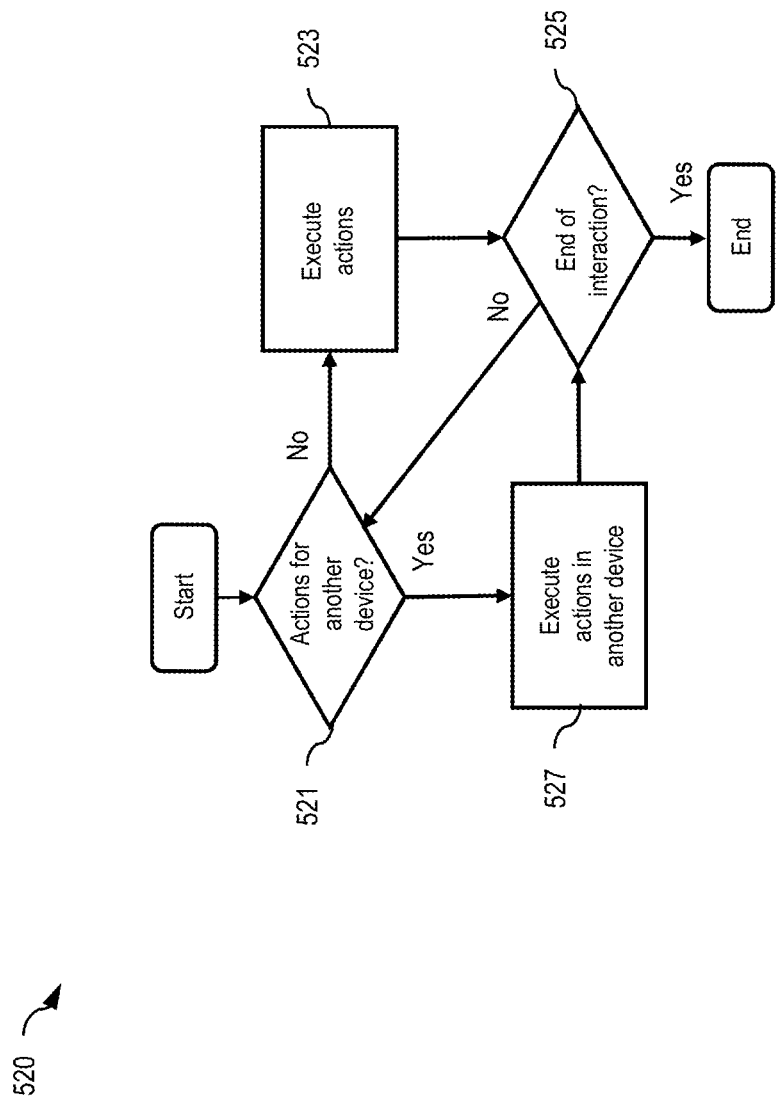

FIG. 5B depicts process flow chart 520 where device "A" coordinates one or more available actions associated with one or more component service in a mashup service. At step 521 device "A" determines if one or more actions associated with a mashup service may be executed by one or more other devices; if there are no actions for the other devices and/or if the other devices do not have processing capabilities (dumb devices, e.g., loud speakers) then at step 523, device "A" executes one or more available actions and proceeds to step 525 for determining whether additional actions and/or interactions (e.g., with other devices and/or service providers) may be necessary. If not, the process 520 end, however, if additional interactions are determined at step 525, then the process 520 returns to step 521 to begin the process again.

Further, if at step 521 it is determined that there are actions available for other devices, then the process continues to step 527 where one or more actions are caused to be executed at the one or more other devices.

FIG. 5C depicts process flow chart 550 where there may be no actions, data, and/or steps available at a local cache at device "A", wherein the device "A" may have or may acquire a connection to the mashup service platform 109 for requesting actions for one or more local mashup services. In one embodiment, a request may be submitted to the mashup service platform 109 even when device "A" determines one or more actions from its local cache so that the mashup service platform 109 may provide any additional (e.g., updated) actions for one or more local mashup services. At step 551, device "A" performs a search for one or more local component services and at step 553, if there are no updates to any parameters of the one or more local mashup services (e.g., triggering conditions, data, actions, etc.) then process ends without further steps so to save energy and bandwidth. However, if there are updates, then at step 555 the updates are sent (e.g., in tuples of triggers, action, action data, etc.) to the mashup service platform 109 and/or to service providers 107. At step 557, the mashup service platform 109 processes the updates and if there is network connectivity as well as if there are other devices capable of executing actions, at step 559 one or more parameters of one or more actions are (e.g., tuples) may be sent to the devices, wherein at step 561, the devices may store the parameters in one or more local cache devices. In various embodiments, when connectivity to the mashup service platform 109 and/or to service providers 107 is not available or it is sporadic, the mashup parameters may be temporarily stored/carried by one device via a peer-to-peer network until the parameters can be sent to the mashup service platform 109 and/or to service providers 107 via one or more network connections when available.

Figure 5D:
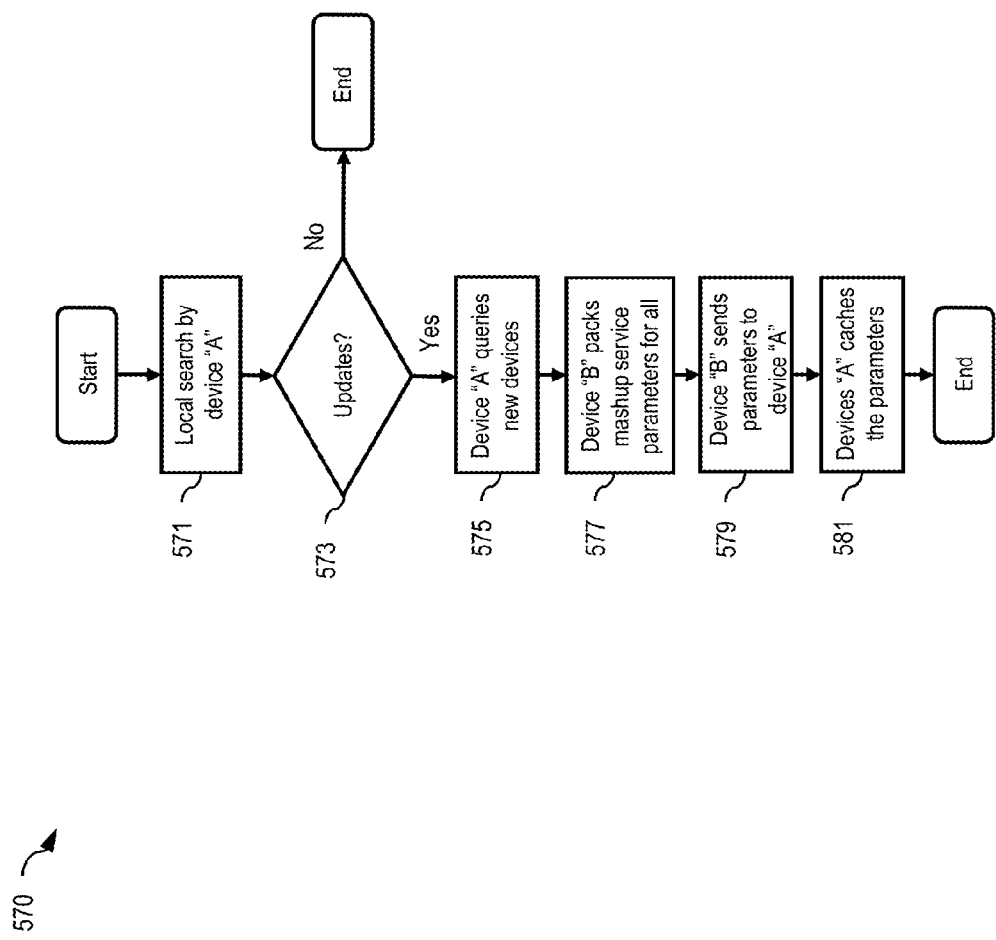

FIG. 5D depicts process flow chart 570 where one or more local devices may advertise/broadcast information on one or more actions which they are capable of participating in. At step 571 device "A" may perform a search for availability of one or more local component services and/or devices and at step 573 if it is determined that there are no updates to availability of the one or more local component services and/or devices, then the process ends; however, if it is determined that there are updates, then at step 575 device "A" queries for the new devices. At step 577, for example, a device "B" processes mashup service parameters for all available devices and at step 579, the device "B" sends the parameters to device "A" and/or one or more other devices. At step 581, the device "A" and/or the one or more other devices cache and/or cause storing of the parameters at local storing devices. In various embodiments, utilizing peer devices as a source for locally coordinated actions may allow for a mashup service system to function with or without access to a central platform (e.g., mashup service platform 109). In various embodiments, one or more devices may provide component service actions which may be triggered without involving the originating device. For example, if a user so desires, the devices could share (e.g., propagate) various actions as part of a local discovery process where history of encountered trigger conditions may be used to determine which actions to keep in a cache device, which to delete, which to propagate, and the like.

Otherwise, normal cache management strategies should suffice to prune the cache contents, for example, dropping never or least used actions/items if cache/storage space becomes very limited.

Figure 6:
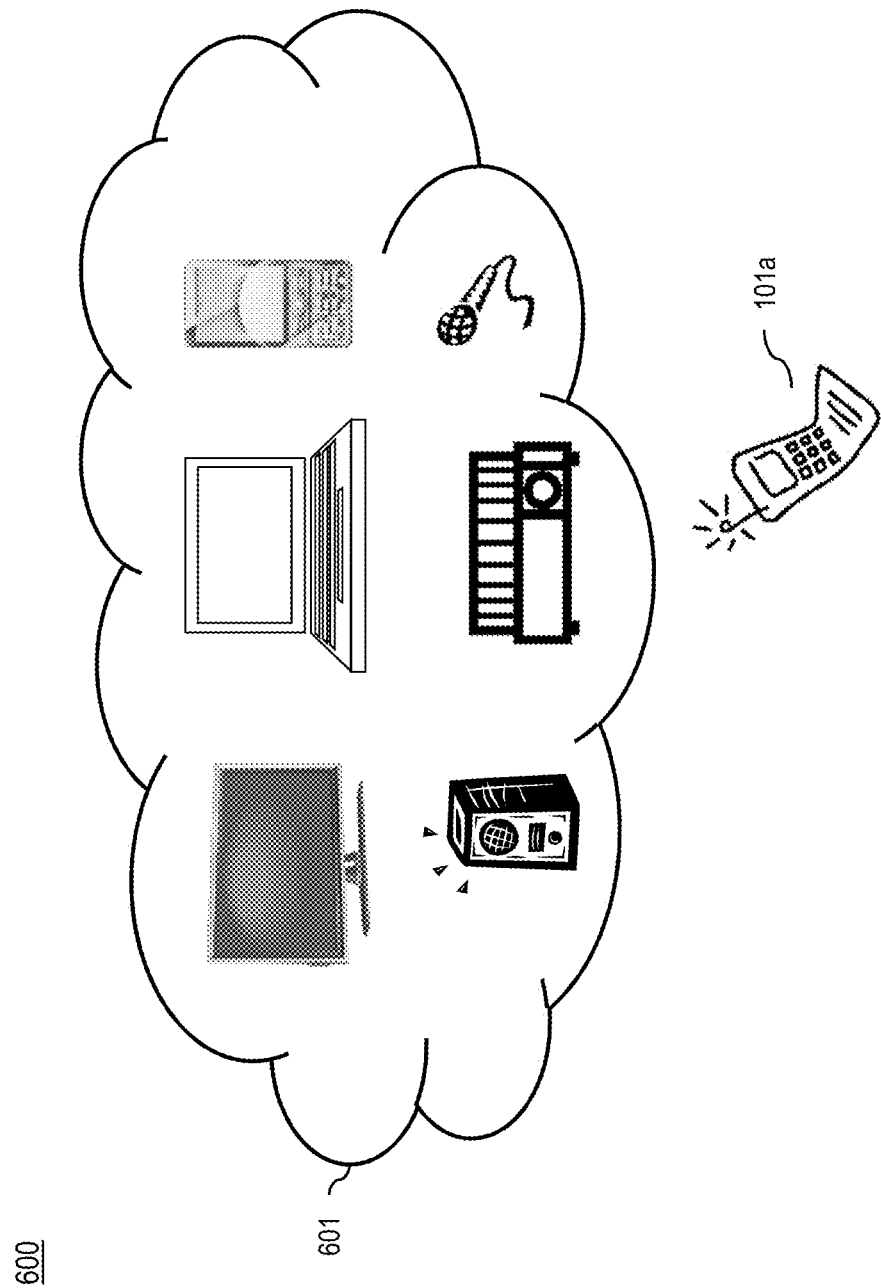
FIG. 6 depicts various devices and component services associated with a mashup service space, according to an embodiment.

FIG. 6 depicts various devices and component services associated with a mashup service space, according to an embodiment. In various embodiments, a space 601 may include various devices (e.g., including various component services) in close proximity to one another, for example, one or more loud speakers, monitors, television sets, mobile devices, microphones, projectors, and the like. Further, one or more other devices (e.g., UE 101a) may join/enter the 601 space, wherein the devices may share one or more connections (e.g., wireless, wired, etc.) for communication and exchange of various data, information, parameters, actions, codes, and the like. In various embodiments, the one or more devices in space 601 and/or devices connected to the space 601 may include local processing and/or storage capabilities, for example, to communicate with one or more other devices and/or networks, to determine one or more updates when new devices join the space 601 and/or devices leave the space 601, execute one or more software, algorithms, applications, and the like.

Figure 7A:
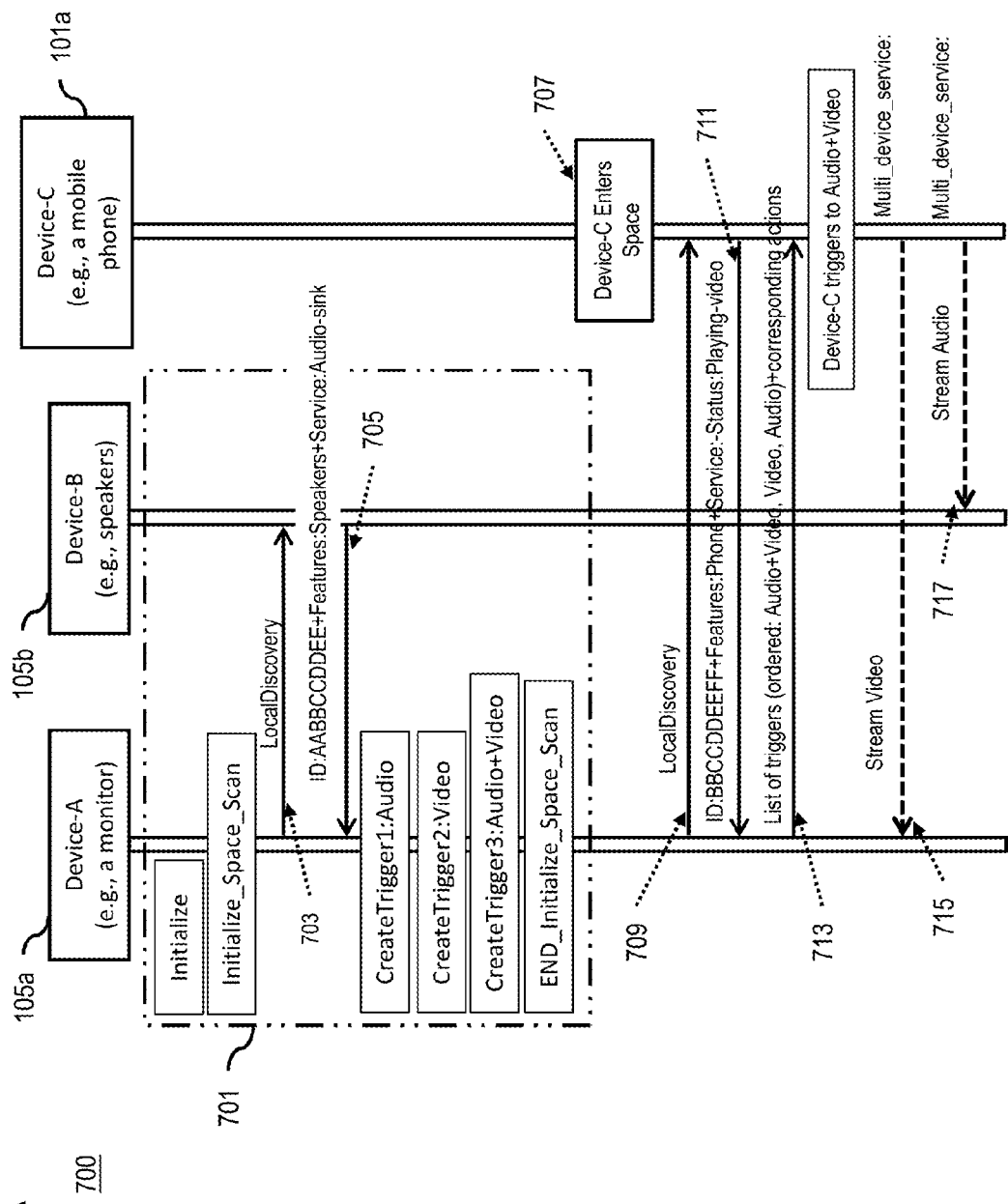
FIGS. 7A through 7C are time sequence diagrams that illustrate sequences of messages and processes for discovering component services and initiating mashup services, according to various embodiments.
Figure 7B:
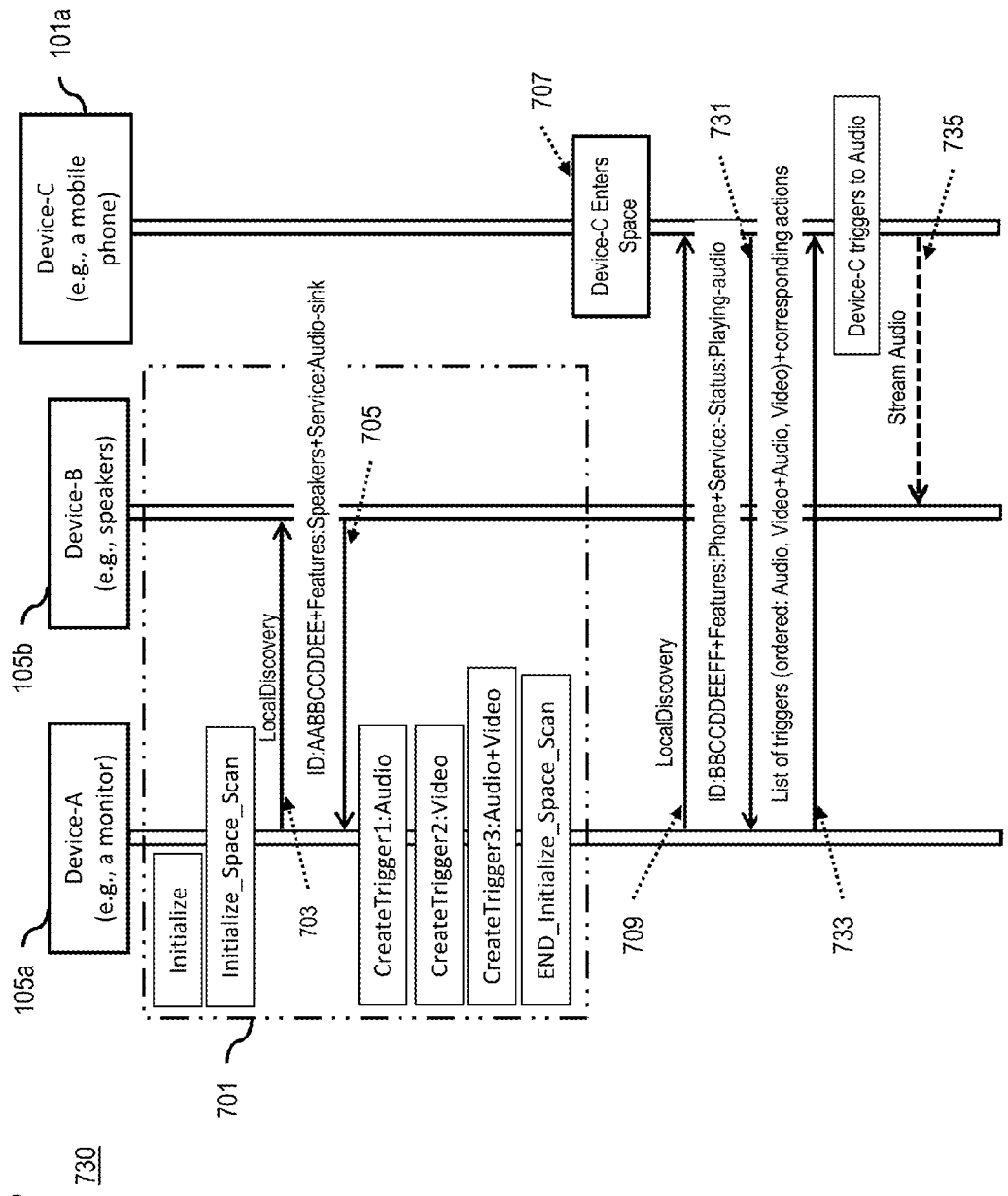
Figure 7C:
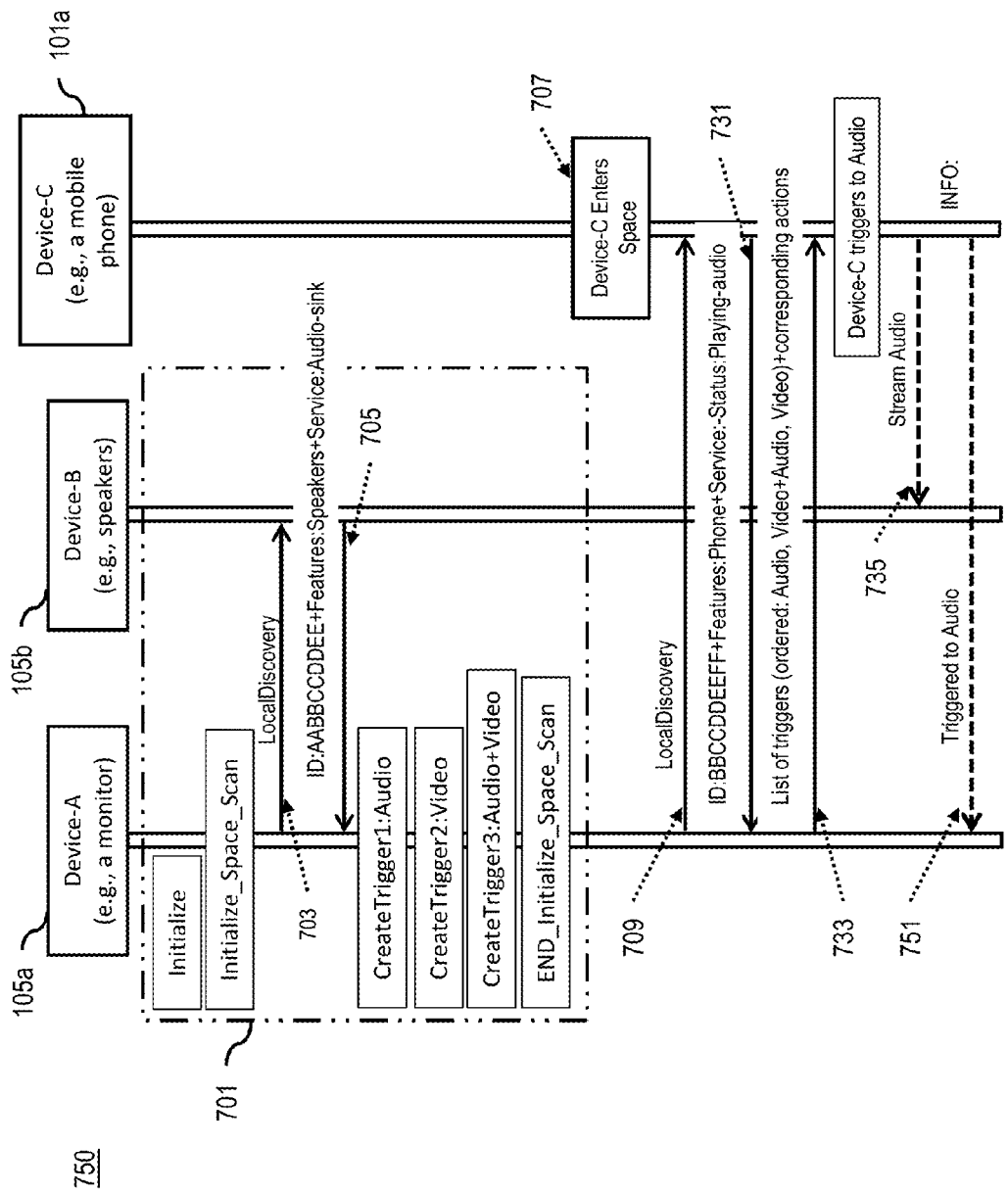

FIGS. 7A through 7C are time sequence diagrams that illustrate sequences of messages and processes for discovering component services and initiating mashup services, according to various embodiments. A device node in a process is represented by a thin vertical box and a message passed from one node to another is represented by horizontal arrows. A space including various nodes is indicated by a closure box.

FIG. 7A depicts process 700 which includes a device "A" 105a, a device "B" 105b, and a device "C" 101a. In one example, device "A" 105a is a display monitor (monitor), device "B" 105b is a loud speaker system (speakers), and device "C" UE 101a (e.g., a mobile phone). In one embodiment, during an initialization phase, the monitor 105a and the speakers 105b are in close proximity in space 701, where the monitor 105a initiates a scan 703 for possibly discovering other devices and/or component services in close proximity, wherein it discovers the speakers 105b. Further, the speakers 105b responds at 705 providing various information about itself, for example, device ID, device type, available component services (e.g., ID:AABBCCDDEE+Features:Speakers+Service:Audio-sink), and the like. In one embodiment, the monitor 105a may generate one or more triggers, for example, Trigger1:audio, Trigger2:video, Trigger3:audio+video, and the like, wherein the triggers may include required and optional information such as connectivity requirements, performance parameters (e.g., color high definition monitor, stereo speakers, Bluetooth ID, etc.) Further, the UE 101a approaches and/or enters the space 701 at 707, wherein the monitor 105a initiates another local discovery at 709, wherein the UE 101a responds at 711 providing various information about itself, for example, device ID, device type, available component services, current processes, (e.g., ID:BBCCDDEEFF+Features:Phone+Service:-Status:Playing-video), and the like. In various embodiments, the discovery scan may be performed by any of the devices in close proximity based on predetermined schedules, continuously, and/or at random. Furthermore, the monitor 105a may determine various information from the UE 101a, for example, properties of the UE 101a, services it is capable of utilizing, current status (e.g. what is it "doing" now), etc. In this example, the monitor 105a determines that the UE 101a is playing a video, whereby the monitor 105a can provide triggers to the UE 101a which may indicate as to the services and combination of those offered in the area. Furthermore, the monitor 105*a* determines one or more triggers and provides the one or more triggers at 713 to the UE 101*a*, wherein the one or more triggers may include one or more trigger tuples (e.g., ordered: Audio+Video, Video, Audio), and the like. The triggers may be ordered/prioritized in such a way that a more appropriate trigger, based on the UE 101*a* information and operating status, may be provided first. In one embodiment, the UE 101*a* may utilize one or more of the component services, for example, a multi-device-service by streaming video at 715 to the monitor 105*a* and streaming audio at 717 to the speakers. In various embodiments, any of the devices may determine the one or more triggers, initiate a discovery scan, determine the one or more triggers, cache the information associated with the space, the devices in the space, trigger conditions, use history, and the like.

In FIG. 7B, in one embodiment, the initialization and discovery steps are similar to those of in FIG. 7A, except that the UE 101*a* status at 731 indicates a different state, wherein the UE 101*a* is playing-audio (e.g., ID:BBCCD-DEEFF+Features:Phone+Service:-Status:Playing-audio). Further, the monitor 105*a* provides a different set of triggers at 733, for example, (ordered: Audio, Audio+Video, Video) where the trigger priorities are organized differently, i.e., Audio is listed as a first trigger in the list. Furthermore, the UE 101*a* triggers to audio and causes establishing of connection 735 to the speakers 105*b* for streaming and/or downloading audio content for audio reproduction at the speakers. Moreover, here it is noted that the monitor 105*a* may coordinate the discovery, the trigger options, a mashup agent, and other mashup service parameters for facilitating the mashup service, however, the monitor 105 a is not part of the interactions in providing the final mashup service (e.g., playing audio via the speakers 105*b*.)

In FIG. 7C, in one embodiment, the initialization and discovery steps are similar to those of in FIG. 7B, except that the UE 101*a* at 751 provides to the monitor 105*a* information on selected trigger (e.g., playing audio via the speakers 105*b*) such that the monitor 105*a* may collect information on combinations of component services, device status/mode, and available services for updating the trigger priority lists, other related mashup service information, and generating new and various combined triggers.

Figure 8B:
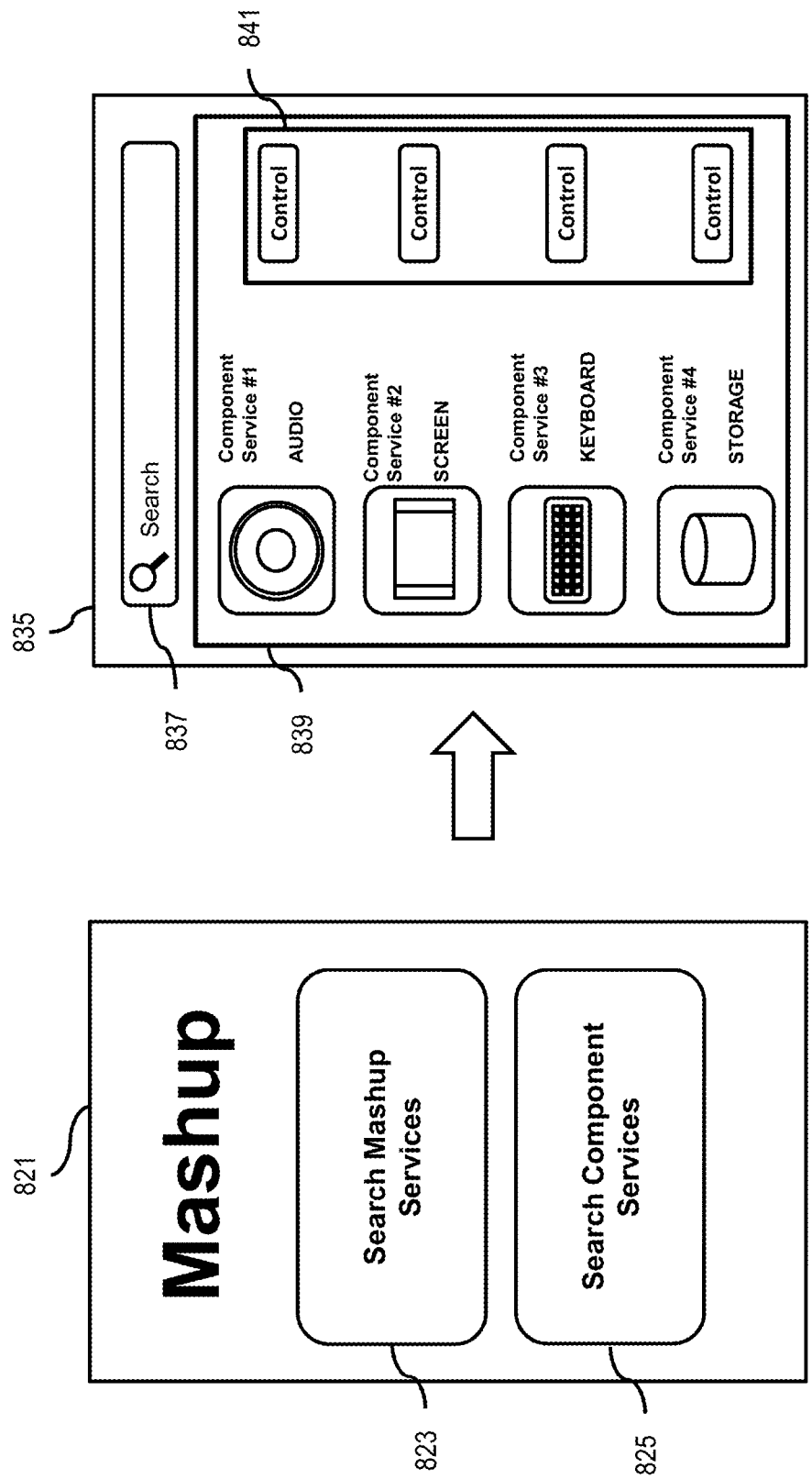
Figure 8C:
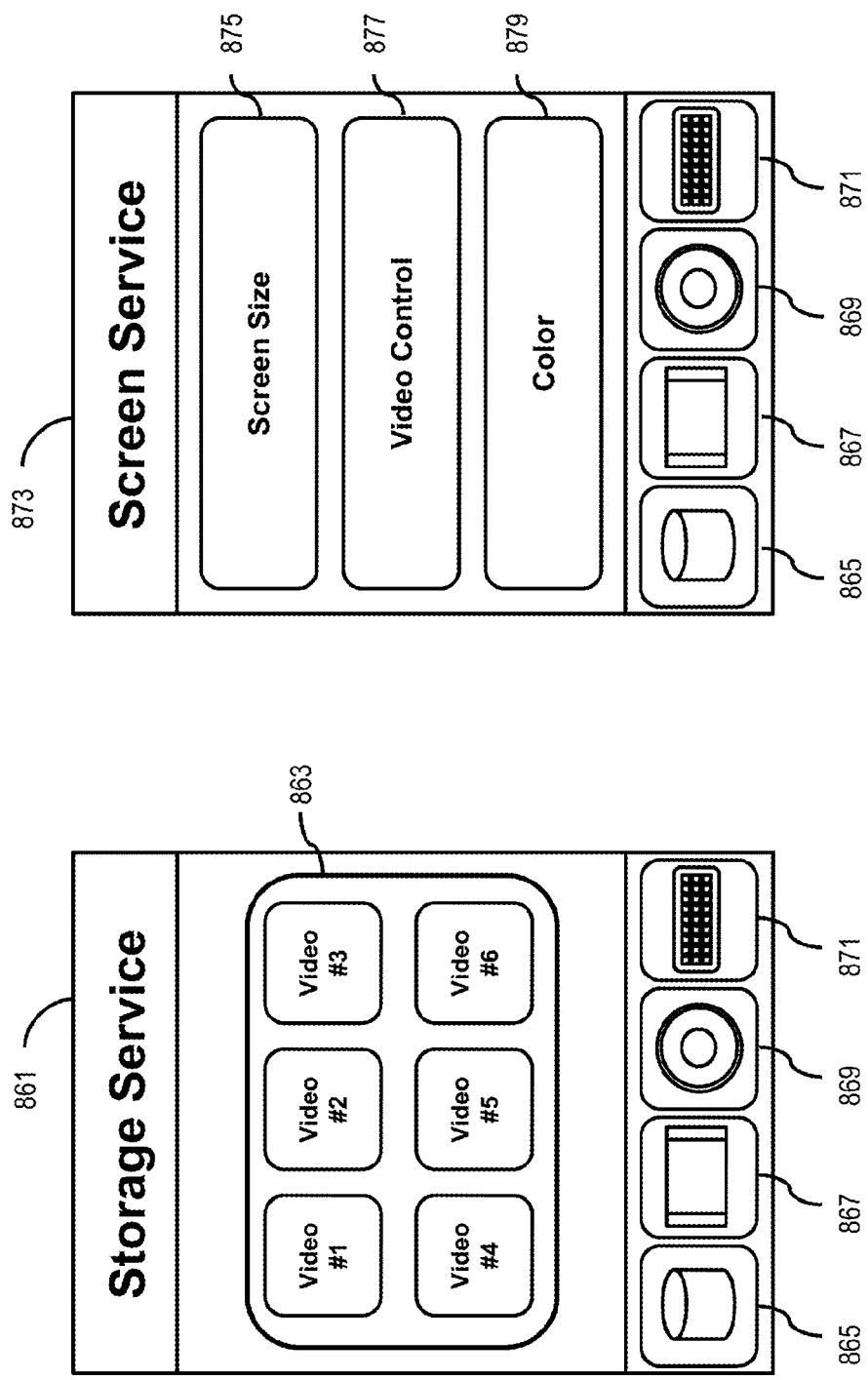

FIGS. 8A through 8C diagrams of user interfaces utilized in the processes of FIGS. 3 and 4, according to various embodiments.

As shown in FIG. 8A, the initial page 821 may display an option to search mashup services 823 and another option to search component services 825. A user's selection of the option to search mashup services may lead to mashup service search page 827. The mashup service search page 827 may include a mashup service search bar 829 and a list of mashup service entries 831. The mashup service search bar 829 may allow users to input keywords to search the mashup services. The mashup service entry 831 may include description of the mashup service and a button 833. The button 833 may either starts the mashup service or installs a mashup service application in case the mashup service is not installed.

As shown in FIG. 8B, a user selection of another option to search component services may lead to component service search page 835. The component service search page 835 may include a component service search bar 837 and a list of component service entry 839. The component service search bar 837 may allow users to input keywords to search the component services. The mashup service entry 831 may include description of the component service and a button 841. The button 841 may either launches detailed information about the component service or a control panel for the component service.

FIG. 4C is an example of the mashup service ("MyTheater") selected from the mashup search page 827. MyTheater is consisted of four local component services, which are a storage service 865, a screen service 867, an audio service 869, and a keyboard service 871. MyTheater enables access and utilization of the component services. Upon selecting the storage service 865, a storage service interface 861 is displayed. The storage service interface 361 presents the contents (e.g., movie, audio, pictures, etc.) 863 in a storage device and allow users to select from the contents. Further, upon selecting the screen service 867, a screen service interface 873 is displayed. The screen service interface 873 allows users to control video by providing video control option 877 or adjust screen settings by providing screen size option 875 and a color setting option 879. Other component services such as the audio service 869 and the keyboard service 871 may present interfaces and features according to their configuration with the mashup service. For example, if a user selects a content 863 from the storage service interface 861, the content may be played by the video control 877 in the screen service interface 873 and the screen setting may be adjusted bases on the user's selection of the options. In addition, through the audio service 869, the audio content from the storage service 865 may be transmitted to the user's home theater system and played. Lastly, the keyboard service 871 may enable users to navigate through the mashup service or input texts while using the mashup service. The component services in MyTheater may be interconnected via Wi-Fi, Bluetooth, short-range radio, etc.

Figure 9:
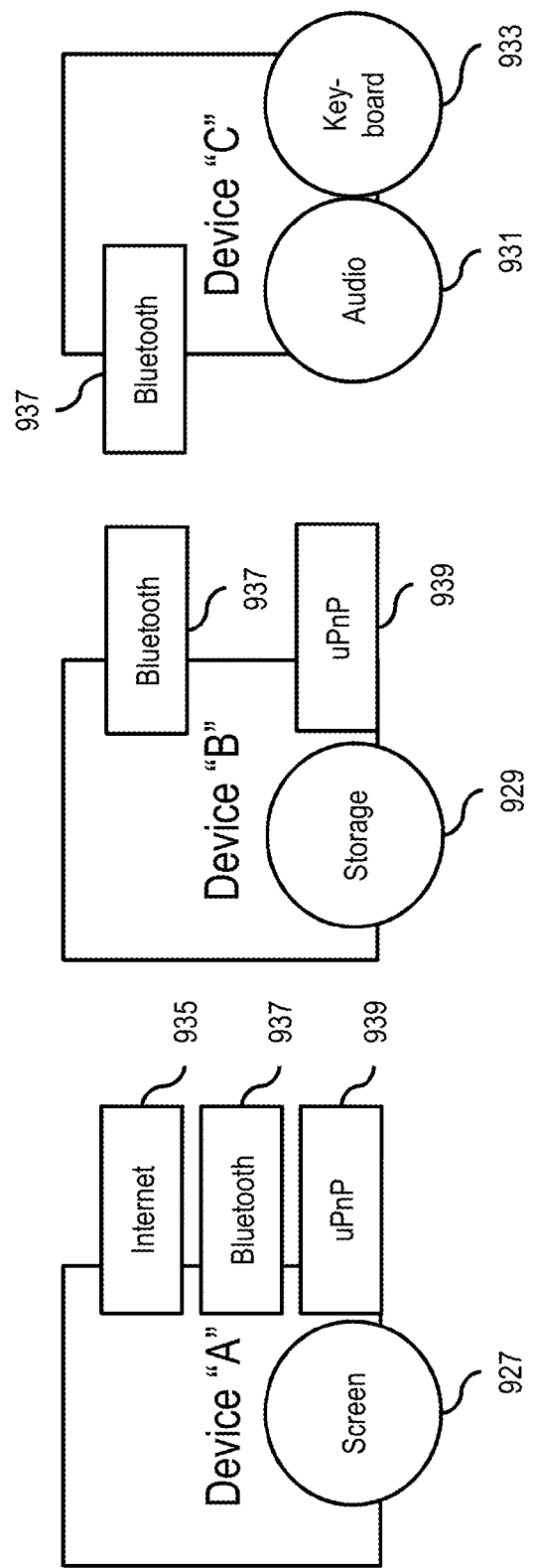
FIG. 9 is a diagram illustrating service registration of different devices with different connectivity techniques, according to various embodiments.

FIG. 9 is a diagram illustrating service registration of different devices with different connectivity techniques, according to various embodiments. Device "A" has internet connectivity 935 and thus, can register a screen service 927 with the mashup service server. Device "A" can perform service discovery in the local area via Bluetooth connectivity 937 or uPnP 939 and report to the mashup service server found local component services such as a storage service 929 associated with Device "B" and an audio service 931 and a keyboard service 933 associated with Device "C". In this way, the mashup service can be consisted of services associate with devices that do not have internet connectivity.

The processes described herein for caching parameters of local mashup services may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 1010 can deploy the illustrated hardware and components of system 1000. Computer system 1000 is programmed (e.g., via computer program code or instructions) to cache parameters of local mashup services as described herein and includes a communication mechanism such as a bus 1010 for passing information between other internal and external components of the computer system

1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of caching parameters of local mashup services.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to caching parameters of local mashup services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for caching parameters of local mashup services. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost.

Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for caching parameters of local mashup services, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014, and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 113 for caching parameters of local mashup services.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080, and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
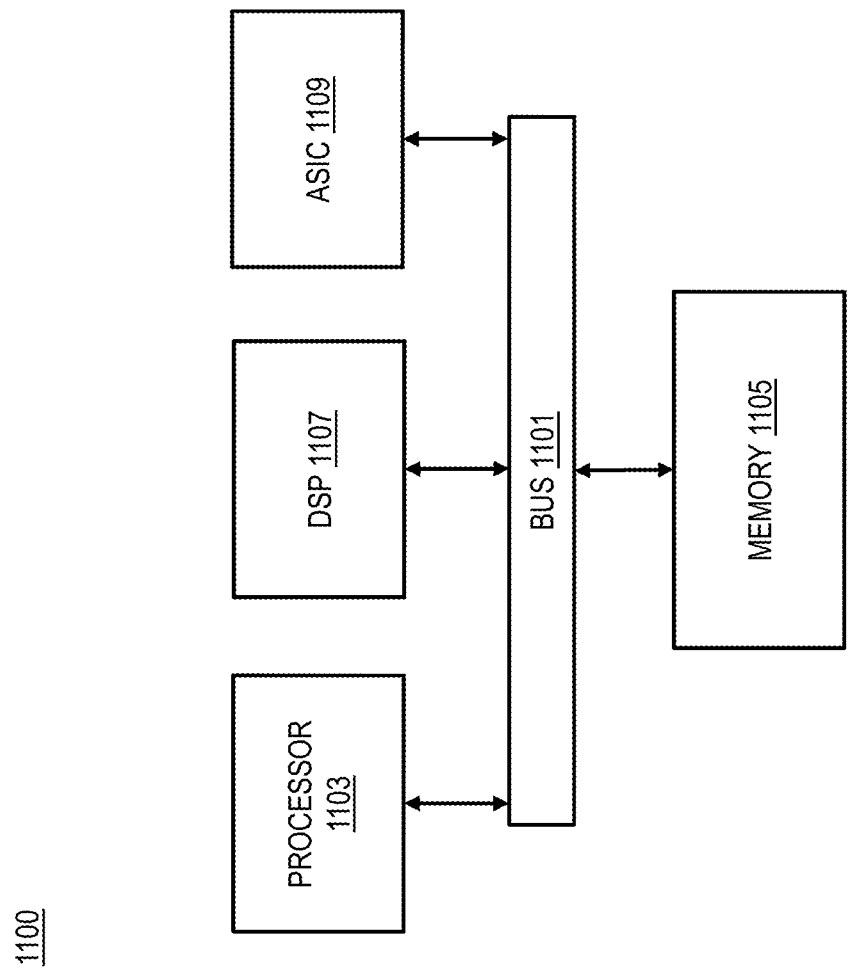
FIG. 11 is a diagram of a chip set that can be used to implement an embodiment of the invention.

FIG. 11 illustrates a chip set or chip 1100 upon which an embodiment of the invention may be implemented. Chip set 1100 is programmed caching parameters of local mashup services as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of caching parameters of local mashup services.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to cache parameters of local mashup services. The memory 1105 also stores the data associated with or generated by the execution of the inventive steps.

Figure 12:
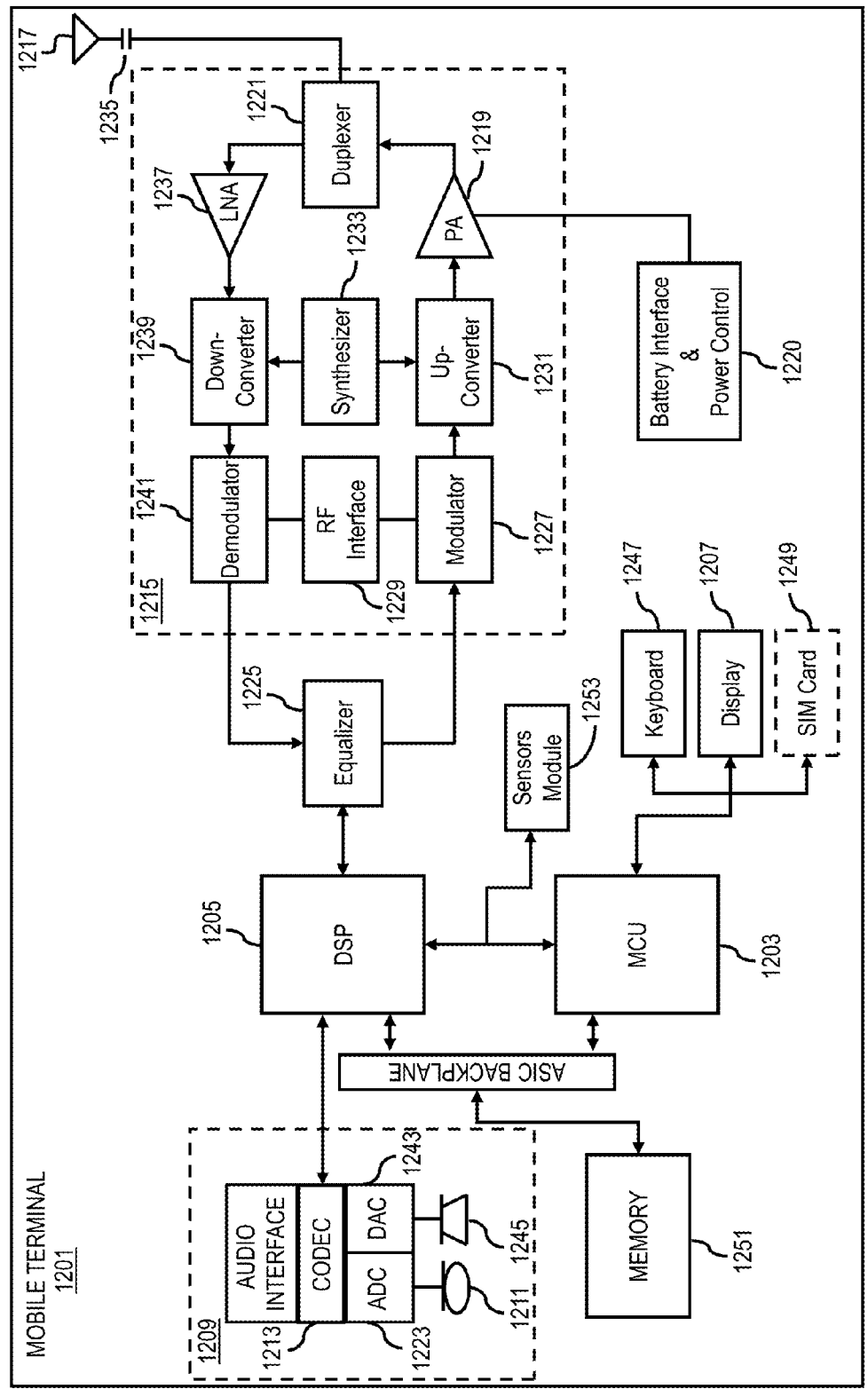
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of caching parameters of local mashup services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of caching parameters of local mashup services. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission through the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 for caching parameters of local mashup services. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Additionally, sensors module 1253 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1201 (e.g., a mobile phone), a user of the mobile terminal 1201, an environment of the mobile terminal 1201 and/or the user, or a combination thereof, wherein the data may be collected, processed, stored, and/or shared with one or more components and/or modules of the mobile terminal 1201 and/or with one or more entities external to the mobile terminal 1201.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining with a processor one or more mashup services, one or more trigger conditions associated with the one or more mashup services, one or more actions associated with the one or more mashup services, or a combination thereof;
    caching with the processor the one or more mashup services, the one or more trigger conditions, the one or more actions, or a combination thereof at one or more local caches;
    determining with the processor one or more results of one or more queries for the one or more mashup services, the one or more trigger conditions, the one or more actions, or a combination thereof from the one or more local caches;
    determining historical use information for the one or more mashup services, the one or more trigger conditions, the one or more actions, or a combination thereof; and
    caching the historical use information at the one or more local caches,
    wherein the historical use information comprises information on a mashup service last used, trigger conditions that cause the mashup service, and types of component services utilized for the mashup service, and
    wherein the caching of the one or more mashup services, the one or more trigger conditions, the one or more actions, or a combination thereof is based on the historical use information.

2. The method of claim 1, further comprising:
    discovering one or more component services available to at least one device; and
    generating the one or more queries based on the one or more component services.

3. The method of claim 2, wherein the one or more local caches are associated with the at least one device, one or more other devices associated with the one or more component services, or a combination thereof.

4. The method of claim 3, wherein the discovering, the determining of the one or more results, or a combination thereof are performed using local connectivity among the at least one device, the one or more other devices, or a combination thereof.

5. The method of claim 3, further comprising:
    distributing the one or more mashup services, the one or more trigger conditions, the one or more actions, or a combination thereof among the one or more local caches based on capability information, resource availability information, or a combination thereof associated with the at least one device, the one or more other devices, or a combination thereof.

6. The method of claim 2, further comprising:

determining one or more agent interfaces for the one or more mashup services from the at least one local cache; and initiating (a) the one or more mashup services, (b) an evaluation of the one or more trigger conditions, (c) the one or more actions, or (d) a combination thereof via the one or more agent interfaces.

7. The method of claim 6, further comprising:

coordinating the one or more mashup services among the one or more component services, the at least one device, the one or more other devices, or a combination thereof via the one or more agent interfaces.

8. The method of claim 2, further comprising:

generating one or more updated queries based on one or more updates to the one or more component services.

9. The method of claim 8, wherein the discovering is performed periodically, according to a schedule, on demand, or a combination thereof to determine the one or more updates.

10. An apparatus comprising:

at least one processor; and at least one memory including computer program code for one or more programs, the at least one memory and the computer program code configured to, with the at least one processor, cause the apparatus to perform at least the following, determine one or more mashup services, one or more trigger conditions associated with the one or more mashup services, one or more actions associated with the one or more mashup services, or a combination thereof;

cause a caching of the one or more mashup services, the one or more trigger conditions, the one or more actions, or a combination thereof at one or more local caches;

determine one or more results of one or more queries for the one or more mashup services, the one or more trigger conditions, the one or more actions, or a combination thereof from the one or more local caches;

determine historical use information for the one or more mashup services, the one or more trigger conditions, the one or more actions, or a combination thereof; and cause a caching of the historical use information at the one or more local caches, wherein the historical use information comprises information on a mashup service last used, trigger conditions that cause the mashup service, and types of component services utilized for the mashup service, and wherein the caching of the one or more mashup services, the one or more trigger conditions, the one or more actions, or a combination thereof is based on the historical use information.

11. The apparatus of claim 10, wherein the apparatus is further caused to:

cause a discovery of one or more component services available to at least one device; and cause a generation of the one or more queries based on the one or more component services.

12. The apparatus of claim 11, wherein the one or more local caches are associated with the at least one device, one or more other devices associated with the one or more component services, or a combination thereof.

13. The apparatus of claim 12, wherein the discovery, the determining of the one or more results, or a combination thereof are performed using local connectivity among the at least one device, the one or more other devices, or a combination thereof.

14. The apparatus of claim 12, wherein the apparatus is further caused to:

cause a distribution of the one or more mashup services, the one or more trigger conditions, the one or more actions, or a combination thereof among the one or more local caches based on capability information, resource availability information, or a combination thereof associated with the at least one device, the one or more other devices, or a combination thereof.

15. The apparatus of claim 11, wherein the apparatus is further caused to:

determine one or more agent interfaces for the one or more mashup services from the at least one local cache; and cause an initiation of (a) the one or more mashup services, (b) an evaluation of the one or more trigger conditions, (c) the one or more actions, or (d) a combination thereof via the one or more agent interfaces.

16. The apparatus of claim 15, wherein the apparatus is further caused to:

cause a coordination of the one or more mashup services among the one or more component services, the at least one device, the one or more other devices, or a combination thereof via the one or more agent interfaces.

17. The apparatus of claim 11, wherein the apparatus is further caused to:

cause a generation of one or more updated queries based on one or more updates to the one or more component services.

18. The apparatus of claim 17, wherein the discovery is performed periodically, according to a schedule, on demand, or a combination thereof to determine the one or more updates.

* * * * *